(12) United States Patent
Ertem et al.

(10) Patent No.: US 11,609,318 B2
(45) Date of Patent: Mar. 21, 2023

(54) METHOD AND SYSTEM FOR PERFORMING LOCATION DETERMINATION BASED ON SEQUENCE OF PULSES

(71) Applicants: University Research Foundation, Greenbelt, MD (US); MaXentric Technologies, LLC, Fort Lee, NJ (US)

(72) Inventors: Mehmet Can Ertem, Bethesda, MD (US); Eric Heidhausen, Woodbine, MD (US); Serdar Boztas, Melbourne (AU); Kamran Mahbobi, Closter, NJ (US); Brian Woods, Bogota, NJ (US)

(73) Assignees: University Research Foundation, Greenbelt, MD (US); MaXentricTechnoloaies LLC, Fort Lee, NJ (US)

( * ) Notice: Subject to any disclaimer, the term of this patent is extended or adjusted under 35 U.S.C. 154(b) by 202 days.

(21) Appl. No.: 17/005,432

(22) Filed: Aug. 28, 2020

(65) Prior Publication Data
US 2021/0063555 A1 Mar. 4, 2021

Related U.S. Application Data

(60) Provisional application No. 62/893,001, filed on Aug. 28, 2019.

(51) Int. Cl.
*G01S 13/00* (2006.01)
*G01S 7/282* (2006.01)
*G01S 13/10* (2006.01)

(52) U.S. Cl.
CPC ............ *G01S 13/003* (2013.01); *G01S 7/282* (2013.01); *G01S 13/10* (2013.01)

(58) Field of Classification Search
CPC ......... G01S 13/003; G01S 7/282; G01S 13/10
See application file for complete search history.

(56) References Cited

U.S. PATENT DOCUMENTS

| 4,429,312 A * | 1/1984 | Chisholm | G01S 13/86 342/410 |
| 7,983,373 B2 * | 7/2011 | Dyer | H04L 47/25 375/348 |

(Continued)

OTHER PUBLICATIONS

Vaghefi, et al. "Improving Positioning in LTE through Collaboration", ResearchGate, Virginia Polytechnic Institute and State University, Mar. 2014, 7 pages, https://www.researchgate.net/publication/261177505.

*Primary Examiner* — Peter M Bythrow
*Assistant Examiner* — Nazra Nur Waheed
(74) *Attorney, Agent, or Firm* — TannerIP PLLC; Daniel A. Tanner, III; James E. Golladay, II

(57) ABSTRACT

A surface-based transmitter system for assisting determination of vehicle location is presented. The system comprises a set of radio frequency (RF) transmitter nodes that, when deployed at different respective locations, are configured to output a sequence of respective RF pulses with a predefined inter-pulse delay between each pair of consecutive RF pulses in the sequence, wherein the pre-defined inter-pulse delay is longer than 1 microsecond. The set of RF transmitter nodes include at least a first RF transmitter node, a second RF transmitter node, a third RF transmitter node, and a fourth RF transmitter node, which are configured to output a first RF pulse, a second RF pulse, a third RF pulse, and a fourth RF pulse, respectively, of the sequence of RF pulses.

13 Claims, 34 Drawing Sheets

(56) References Cited

U.S. PATENT DOCUMENTS

| | | | |
|---|---|---|---|
| 8,576,928 B2* | 11/2013 | Allen | H04L 25/4917 |
| | | | 375/257 |
| 2016/0363659 A1* | 12/2016 | Mindell | G01S 13/74 |
| 2017/0338874 A1* | 11/2017 | Pratt | H04B 7/0862 |
| 2020/0319330 A1* | 10/2020 | Bliss | G01S 13/876 |

* cited by examiner

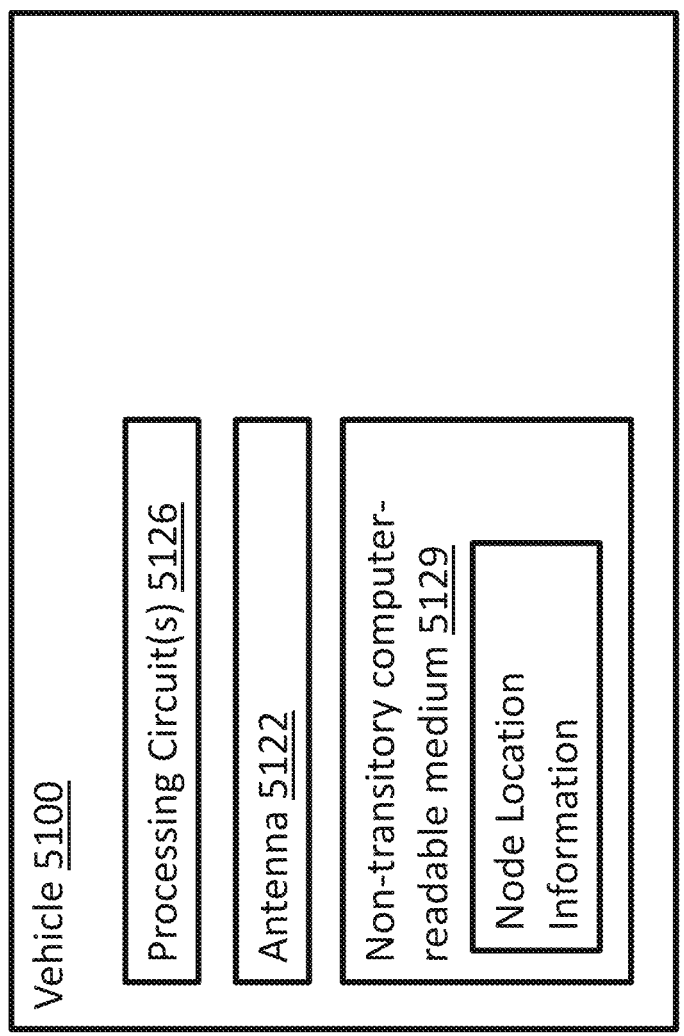

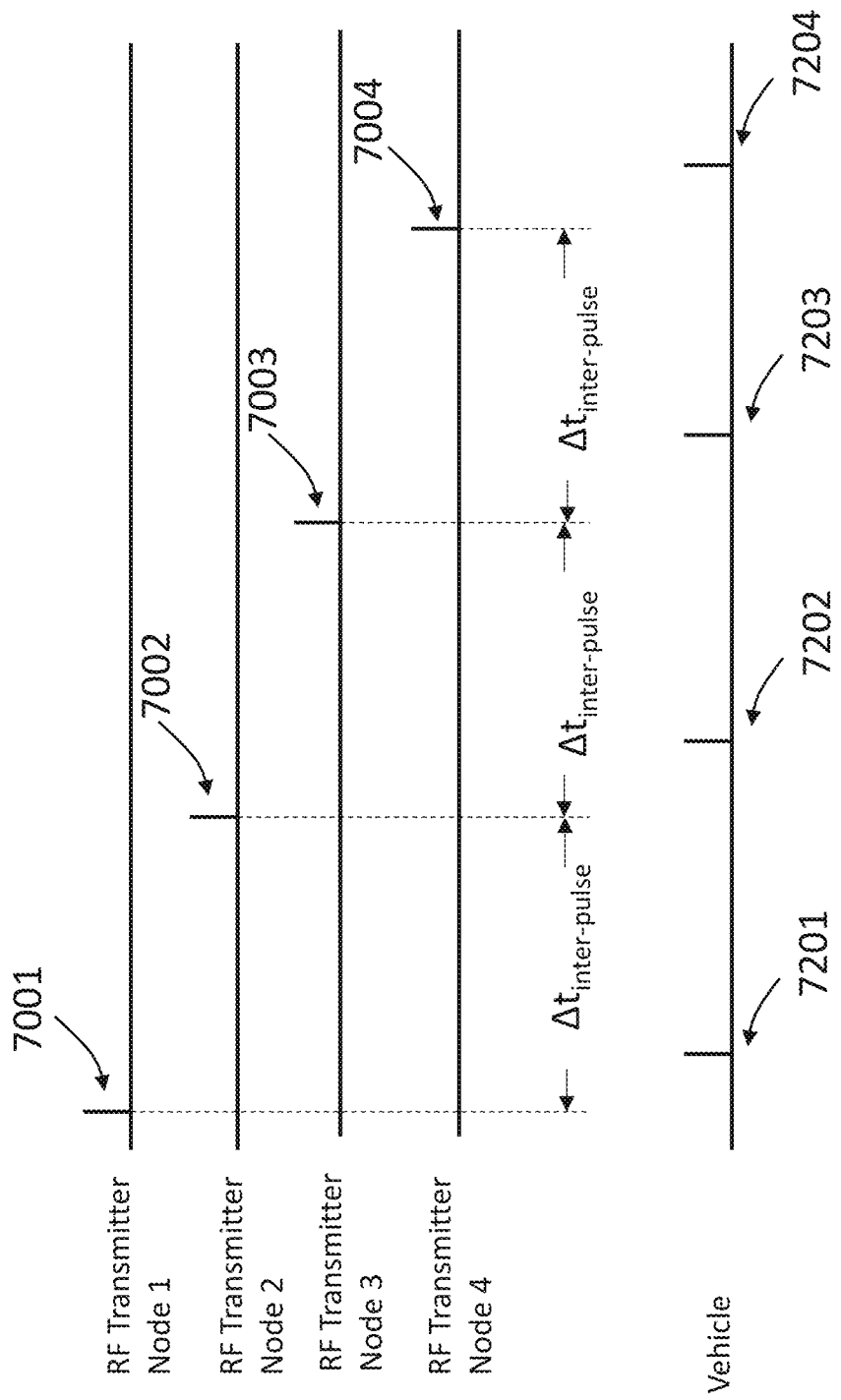

METHOD AND SYSTEM FOR PERFORMING LOCATION DETERMINATION BASED ON SEQUENCE OF PULSES

CROSS-REFERENCE TO RELATED APPLICATION

The present application claims priority to U.S. Provisional Application No. 62/893,001, entitled "Ground based Ultra-wideband Multistatic Positioning System for VTOL Guidance and GPS Integrity Monitoring," filed Aug. 28, 2019, the entire content of which is incorporated by reference herein in its entirety.

FIELD OF THE INVENTION

The present invention is directed to a method and system for performing location determination based on a sequence of pulses.

BACKGROUND

Use of vertical takeoff and landing (VTOL) aircraft, especially within the context of urban air mobility (UAM), may involve a need for precise determination of a location of the aircraft. For both piloted and autonomous aircraft, a primary means of providing navigation for the aircraft during takeoff and landing of the aircraft is through a global positioning system (GPS), or through an instrument landing system (ILS).

SUMMARY

One aspect of the present disclosure relates to a surface-based transmitter system for assisting determination of vehicle location. The system comprises a set of radio frequency (RF) transmitter nodes that, when deployed at different respective locations, are configured to output a sequence of respective RF pulses with a predefined inter-pulse delay between each pair of consecutive RF pulses in the sequence, wherein the pre-defined inter-pulse delay is longer than 1 microsecond. The set of RF transmitter nodes include at least a first RF transmitter node, a second RF transmitter node, a third RF transmitter node, and a fourth RF transmitter node, which are configured to output a first RF pulse, a second RF pulse, a third RF pulse, and a fourth RF pulse, respectively, of the sequence of RF pulses.

One aspect of the present disclosure relates to a method for determining a location of a vehicle. The method comprises detecting, by the vehicle, a sequence of radio frequency (RF) pulses that are generated and outputted, respectively, by a set of surface-based RF transmitter nodes. The the sequence of RF pulses include at least a first RF pulse, a second RF pulse, a third RF pulse, and a fourth RF pulse, which are outputted by a first RF transmitter node, a second RF transmitter node, a third RF transmitter node, and a fourth RF transmitter node, respectively, of the set of RF transmitter nodes with a predefined inter-pulse delay between each pair of consecutive RF pulses of the sequence of RF pulses, wherein the predefined inter-pulse delay is at least 1 microsecond. The method further comprises determining propagation times that indicative respective amounts of time taken by the set of RF pulses to directly propagate to the vehicle; and comprises determining, based on the propagation times, a location of the vehicle relative to the set of surface-based RF transmitter nodes.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 5 depicts an example of a vehicle according to an embodiment herein.

FIGS. 7A-7E provide timing diagrams which illustrate a sequence of RF pulses, according to embodiments herein.

FIGS. 8A-8E illustrate the use of RF pulses to determine a location of a vehicle, according to embodiments herein.

DETAILED DESCRIPTION

Figure 1A:
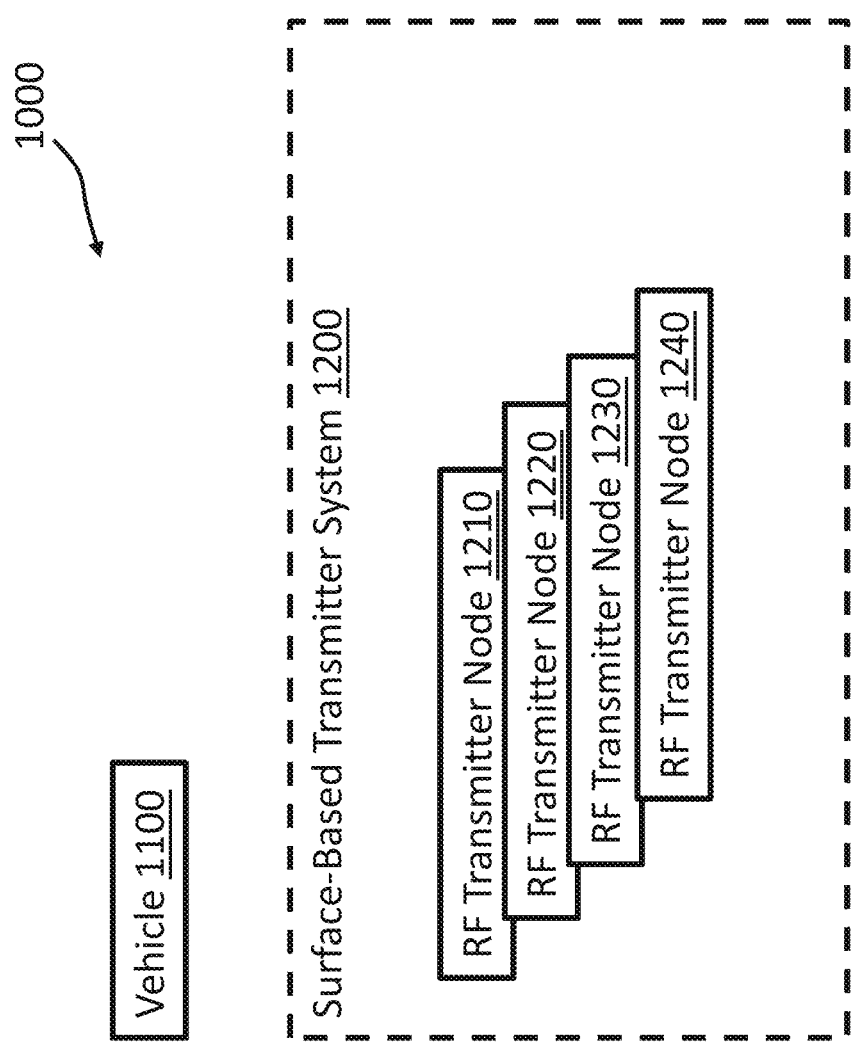
FIGS. 1A and 1B depict block diagrams which illustrate a vehicle and a surface-based transmitter system having a set of radio frequency (RF) transmitter nodes, according to embodiments herein.

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer only to alternatives or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited, elements or method steps.

One aspect of the present disclosure relates to a system that uses a sequence of radio frequency (RF) pulses broadcasted, emitted, or otherwise outputted by surface-based RF transmitter nodes to facilitate determination of a vehicle, such as an aircraft or automobile. In some instances, the vehicle may be a Vertical Takeoff and Landing (VTOL) aircraft, and the system may facilitate navigation of the aircraft relative to a Takeoff and Landing Area (TOLA) or other landing zone. The TOLA may be fixed on the ground, on a building, or may be mobile on land or aboard a ship, e.g., its flight deck. The location of the TOLA may be known, or the TOLA may be set up ad-hoc, without surveying its coordinates. Although a Global Positioning System (GPS) may be used to determine a location of the aircraft, GPS signaling may be unavailable or unreliable in a GPS-denied environment, in which GPS signaling may experience interference or attenuation. Some vehicles may use an instrument landing system (ILS) to augment or replace the use of GPS, but ILS may be unsuitable for guiding a VTOL aircraft or other vehicle near a TOLA because of the cost and complexity of ILS. Further, navigating a VTOL aircraft as it approaches a TOLA or other landing zone may involve taking into account a reduced airspeed of the VTOL aircraft, an ability of the VTOL aircraft to descend at various speeds and to hover if necessary, a small footprint of the vertical approach cone to the TOLA, and a much smaller range from a landing pad to the VTOL aircraft during approach. These features indicate a need to develop a location determination system that replaces or augments the use of GPS or ILS. The TOLA may be fixed on the ground, on a building, or may be mobile on land or aboard a ship (e.g., on a flight deck). The location of the TOLA may be known, or the TOLA may be set up ad-hoc, without surveying its coordinates.

More particularly, various embodiments herein involve a surface-based transmitter system that includes a set of RF transmitter nodes, which may be configured to output a sequence of RF pulses. If an aircraft or other vehicle is in an environment of the surface-based transmitter system, such as in an airspace within a certain range of the surface-based transmitter system (e.g., within 1000 feet or 5000 feet), the RF pulses may reflect off the vehicle, and/or trigger the vehicle to output a reply pulse. The RF transmitter nodes may be arranged in a multistatic configuration in which each of the RF transmitter nodes is adapted to listen for or otherwise detect RF pulses outputted by the other RF transmitter nodes, and to detect corresponding reflections and/or reply pulses. The RF pulses, the reflections, and/or the reply pulses may be used by the surface-based transmitter/transceiver system and/or by the vehicle to determine a location of the vehicle, as discussed below in more detail. These surface transceivers may also determine each other's relative positions by listening to the transmissions of each other. In some cases, the surface-based system may also detect uncooperating or unauthorized objects in an area near the TOLA, and may provide a warning of such a situation.

In an embodiment, the RF pulses may have characteristics which allow for precise determination of the location of the vehicle and which reduces a likelihood of multipath interference or other sources of location determination error. For instance, the RF pulses may be separated by an inter-pulse delay that is longer than 1 microsecond (e.g., separated by at least 10 microseconds, or at least 5 microseconds). The inter-pulse delay may provide enough separation between RF pulses so as to reduce a likelihood of the pulses interfering with each other. In some cases, the RF pulses may each be an ultrawideband (UWB) pulse. The UWB pulse may, e.g., have at least one of: a bandwidth of at least 1 GHz, or a duration of shorter than 1 nanosecond. The large bandwidth may provide for high resolution of an RF pulse, especially when the RF pulse is used as a radar pulse, while the short duration may similarly facilitate high resolution and reduce a likelihood of multipath interference. In some implementations, such RF pulses may allow a location of a vehicle to be determined with an accuracy level having a location determination error that is less than a foot (e.g., an error of only a few inches). In some cases, the surface-based transmitter nodes may be located on a ground surface, and may be using ultrawideband pulses. In such a situation, the surface-based transmitter system may be referred to as a ground-based ultrawideband multistatic positioning system (GUMPS). In some cases, the transmitter nodes may be located on a ship surface, in which case they may be referred to as a ship-based ultrawideband multistatic positioning system (SUMPS). In an embodiment, the functionality of GUMPS, including using the GUMPS waveform and that of determining location based on time difference of arrival, can be incorporated into another environment having a high bandwidth communication system (e.g., an environment having 5G communications infrastructure) in which base stations in a cellular communications network act as the ground-based RF transmitter nodes. In such an embodiment, the base stations may be configured to synchronize among themselves, and provide precise position determination capability. This allows the system to have a secondary function that could provide precise position determination capability to a suitably equipped receiver embedded with GUMPS algorithms. These techniques could be built into a device (such as a cellular phone, a smart phone, or an embedded system) in order to receive synchronized signals from multiple base stations, and that allows the device to determine its precise position by using the time difference of arrival method of triangulation.

In an embodiment, the use of the RF pulses to determine a vehicle's location may be used to perform GPS integrity monitoring, and/or integrity for ILS, eLORAN, or inertial navigation systems. In such a setup, the location determination system may compare a location of a vehicle determined using any navigation system and a location of the vehicle determined using the RF pulses. The above features are discussed below in more detail.

FIG. 1A provides a block diagram which illustrates an example location determination system 1000 for performing location determination of a vehicle. The location determination system 1000 includes a vehicle 1100 and a surface-based transmitter system 1200. In an embodiment, the vehicle 1100 may be a flight-capable vehicle, which may also be referred to herein as an aircraft. In some cases, the aircraft may be or may include a vertical takeoff and landing (VTOL) aircraft, such as a helicopter or other rotorcraft. In some cases, the VTOL aircraft may be an unmanned aerial vehicle (UAV), such as a drone used to perform automated package delivery. The surface-based transmitter system 1200 may be used to facilitate determination of the aircraft's location, especially in an environment in which a global positioning system (GPS) signal may be too attenuated, is experiencing too much interference, or is otherwise unreliable or unavailable. In some cases, the surface-based transmitter system 1200 may be used to assist the VTOL aircraft in takeoff and/or landing, as discussed below in more detail.

As depicted in FIG. 1A, the surface-based transmitter system 1200 may include a set of radio-frequency (RF) transmitter nodes 1210, 1220, 1230, 1240 (also referred to as transmitter devices). The surface-based transmitter system 1200 may be located on a surface of a piece of land (e.g., in a mountain valley), a surface of a rooftop (e.g., of a building), a body of water (e.g., ocean or lake), a ship or other structure on the body of water, or some other surface. If the vehicle 1100 is an aircraft, the surface may be one on which the aircraft will land, or from which the aircraft will take off. In some cases, the surface-based transmitter system 1200 may include at least four RF transmitter nodes. For instance, the system 1200 may include exactly four, six, ten, or some other number of RF transmitter nodes. In an embodiment, each of the RF transmitter nodes may be a transceiver node which is adapted to have a transmit mode in which the node broadcasts, emits, or otherwise outputs an RF waveform, and a receive mode in which the node receives or otherwise detects an incoming RF waveform. In an embodiment, the vehicle may act as a transceiver node.

In an embodiment, each RF transmitter node of the set of RF transmitter nodes 1210-1240 may be configured to broadcast or otherwise output an RF waveform that is or includes an RF pulse. In a more specific example, the RF waveform and the RF pulse may be a radar waveform and a radar pulse, respectively, used for radar detection in an environment of the transmitter system 1200, such as in an airspace above the RF transmitter nodes 1210-1240. In such an example, the transmitter system 1200 may form a multistatic radar system. In some implementations, the radar pulse generated and broadcasted or otherwise outputted by each of the RF transmitter nodes 1210-1240 may be an ultrawideband (UWB) pulse. As stated above, the use of UWB pulses may provide precise timing and decrease a likelihood of interference between pulses. Such features may facilitate improved resolution, especially over a range of short distances (e.g., 25 to 500 feet). The RF transmitter nodes 1210-1240 may be configured, e.g., to output such UWB pulses in a wide-beam pattern, such as a beam with a main lobe that covers at least 60 degrees relative to a primary direction of propagation (e.g., relative to a vertical direction). Such a beam pattern may cause a RF pulse from any of the RF transmitter nodes 1210-1240 to not only reach and be detected by an overhead aircraft, but to also reach and be detected by the other RF transmitter nodes 1210-1240. In such an example, the RF transmitter nodes 1210-1240 may each be a transceiver node which is adapted to detect an incoming RF pulse (e.g., radar pulse), which may be outputted by another one of the RF transmitter nodes 1210-1240, or by the vehicle 1100 (if the vehicle 1100 has such capability). In some instances, the beam pattern may have an omnidirectional pattern or a hemispheric pattern.

In an embodiment, each of the RF transmitter nodes 1210-1240 may act as a virtual pseudolite for all other RF transmitter nodes 1210-1240 and/or for the vehicle 1100 in the location determination system 1200. In some cases, various processing may be distributed among the RF transmitter nodes 1210-1240. The distributed processing may entail, e.g., encoding into the RF waveforms information needed for determining a location of the vehicle 1100. One of the RF transmitter nodes may make at least some of this information available to other RF transmitter nodes by outputting a RF waveform that encodes or otherwise carries such information. Such an implementation may provide a more robust system that is more tolerant of failure of an individual RF transmitter node.

Figure 1B:
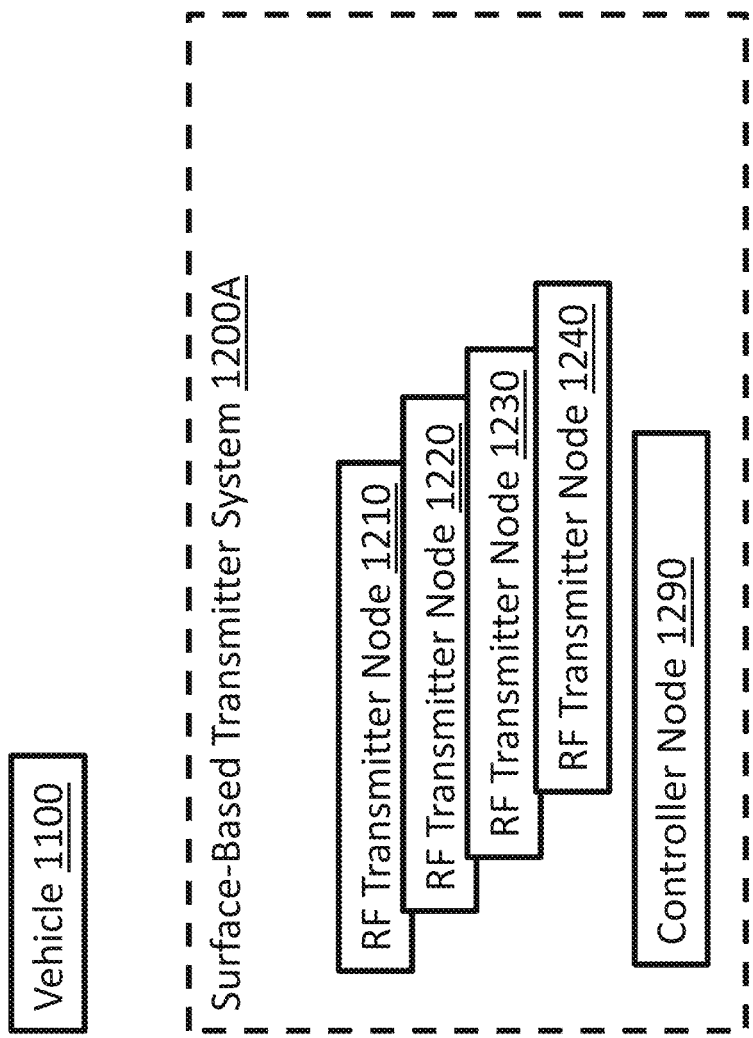

In an embodiment, a controller node may be provided to control various functionality of the surface-based transmitter system 1200. For instance, FIG. 1B depicts a surface-based transmitter system 1200A, which may be an embodiment of the system 1200, that includes a controller node 1290. In some implementations, the controller node 1290 may be configured to synchronize the outputting of RF pulses or other RF waveforms by the set of RF transmitter nodes 1210-1240. As discussed below in more detail, the synchronization may be provided so as to cause the set of RF transmitter nodes 1210-1240 to output a sequence of precisely separated RF pulses. In some implementations, the controller node 1290 may be used to facilitate information sharing among the RF transmitter nodes, such as by relaying the information from one of the RF transmitter nodes 1210-1240 to another one of the RF transmitter nodes 1210-1240. The shared information may include, e.g., propagation time information (also referred to as time-of-arrival information), which is discussed below in more detail. The propagation time information may be used by the location determination system 1200A to determine a location of the vehicle 1100.

Figure 2A:
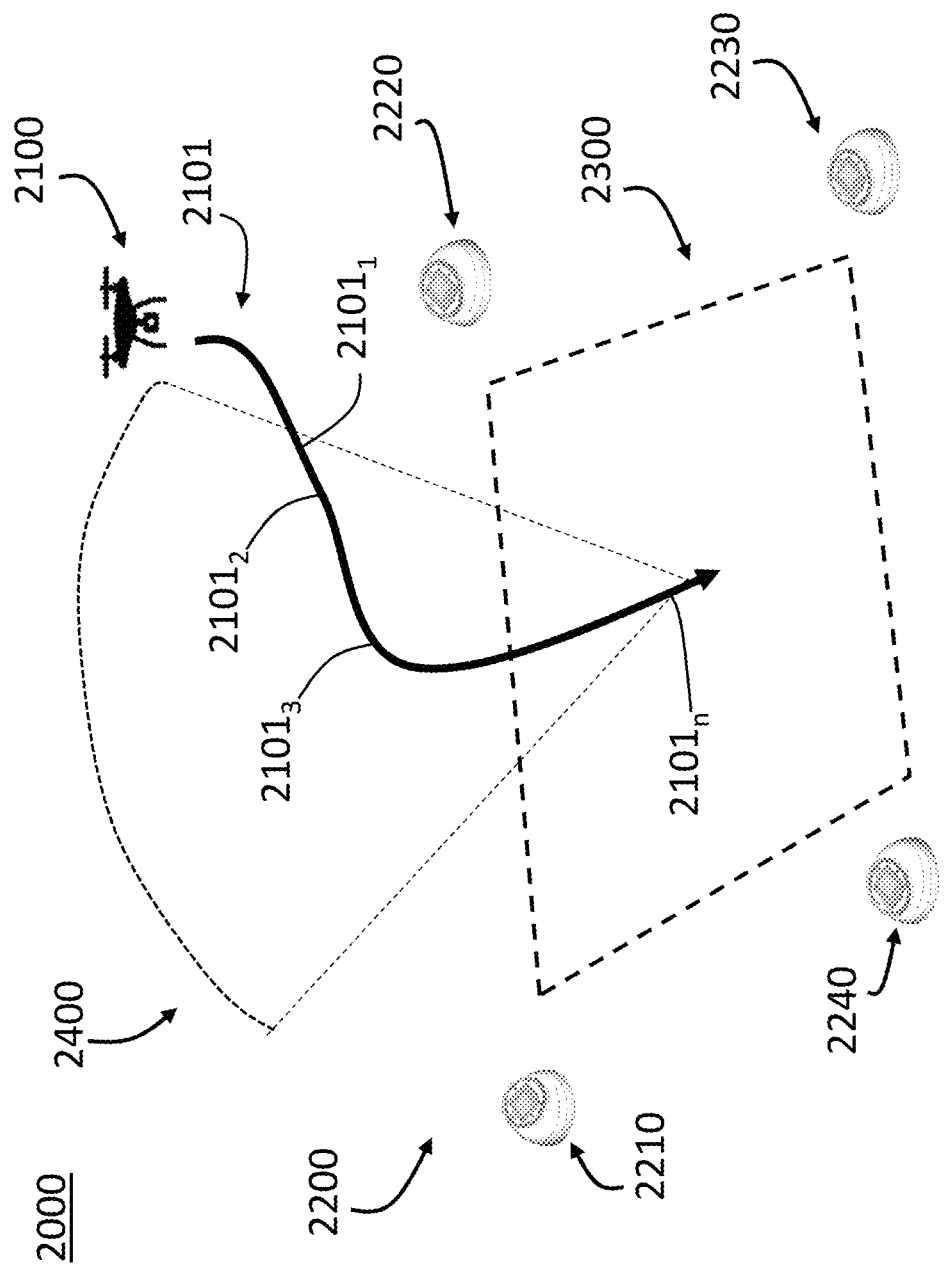
FIGS. 2A-2E illustrate a surface-based transmitter system having a set of radio frequency (RF) transmitter nodes for determining a location of a vehicle, according to embodiments herein.

In an embodiment, the RF transmitter nodes 1210-1240 may be used to identify or define a target region for the vehicle 1100, such as a landing or takeoff zone. As an example, FIG. 2A illustrates a location determination system 2000, which may be a more specific embodiment of the system 1000 of FIG. 1A. The system 2000 includes a vehicle 2100 and a surface-based transmitter system 2200, which may be an embodiment of the vehicle 1100 and the surface-based transmitter system 1200, respectively. More particularly, the vehicle 2200 in this example may be a VTOL aircraft or other flight-capable vehicle. Further, the surface-based transmitter system 2200 may include by at least four RF transmitter nodes 2210, 2220, 2230, 2240 deployed at four different ground locations that are on a periphery of a landing zone 2300 for the vehicle 2100.

In an embodiment, because the RF transmitter nodes 2210-2240 of the transmitter system 2200 are placed around the landing zone 2300, they may be used to guide the vehicle 2100 to land within the landing zone 2300 and/or to take off from the landing zone 2300, especially by being used to determine a location of the vehicle 2100 relative to the nodes 2210-2240. For instance, the transmitter system 2200 may be used to determine locations $2101_1$ through $2101_n$ of the vehicle 2100 at different points in time. The locations $2101_1$ through $2101_n$ may be part of a flight path 2101 of the flight-capable vehicle 2100. In some implementations, the location determination system 2000 may be configured to track the vehicle 2100 to a range of, e.g., 1000 feet above ground level (AGL) of the landing zone 2300, or more specifically when the vehicle 2100 is within a range of, e.g., 25 feet to 200 feet from the landing zone 2300. In other words, the locations $2101_1$ through $2101_n$ that are determined by the system 2000 may be within the range discussed above. In an embodiment, if connectivity is assured, one could replace the air vehicle with a ground vehicle and provide a similar precise relative position report. The landing path may be vertical, or at any angle to the landing zone, or it may be curved, in order to avoid obstacles.

Figure 2B:
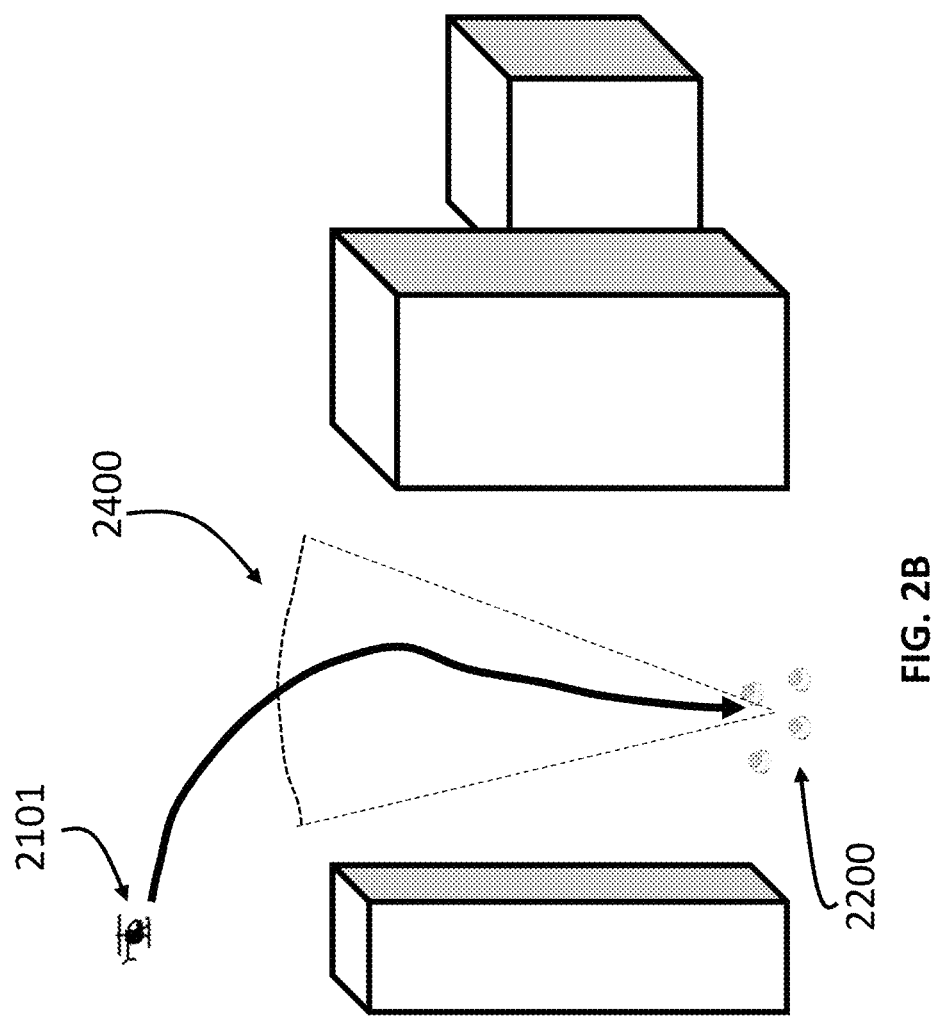

In an embodiment, the surface-based transmitter system 2200 may be used to guide the vehicle 2100 so that it follows a desired trajectory or stays within a desired range of trajectories as it approaches the landing zone 2300. The desired range of trajectories may form, e.g., a cone, such as the approach cone 2400. As stated above, the surface-based transmitter system 2200 may operate in an area in which GPS signaling is experiencing too much interference or attenuation, which may cause the use of GPS to become unavailable or unreliable. For example, FIG. 2B depicts a scenario in which the surface-based transmitter system 2200 is located in an urban canyon, which may be an area surrounded by tall urban structures, such as skyscrapers or other buildings. Such structures may attenuate GPS signaling, and/or create reflection surfaces that can lead to multipath interference in which various signals (e.g., RF signals) and their reflections interfere with each other. As discussed below in more detail, the surface-based transmitter system 2200 may output UWB pulses, and may do so in a sequenced fashion that separates the pulses in time, so as to reduce a likelihood of creating multipath interference. In the scenario depicted in FIG. 2B, the surface-based transmitter system 2200 may be used to output RF pulses, which may be used by the surface-based transmitter system 2200 and/or by a vehicle 2101 (e.g., helicopter) for determining a location of the vehicle 2101. The location that is determined based on the RF pulses may be independent of any GPS-determined location, and may be used as an alternative to using GPS, especially in an environment in which GPS signaling is unavailable, or may be used to check an accuracy of a GPS-determined location.

Figure 2C:
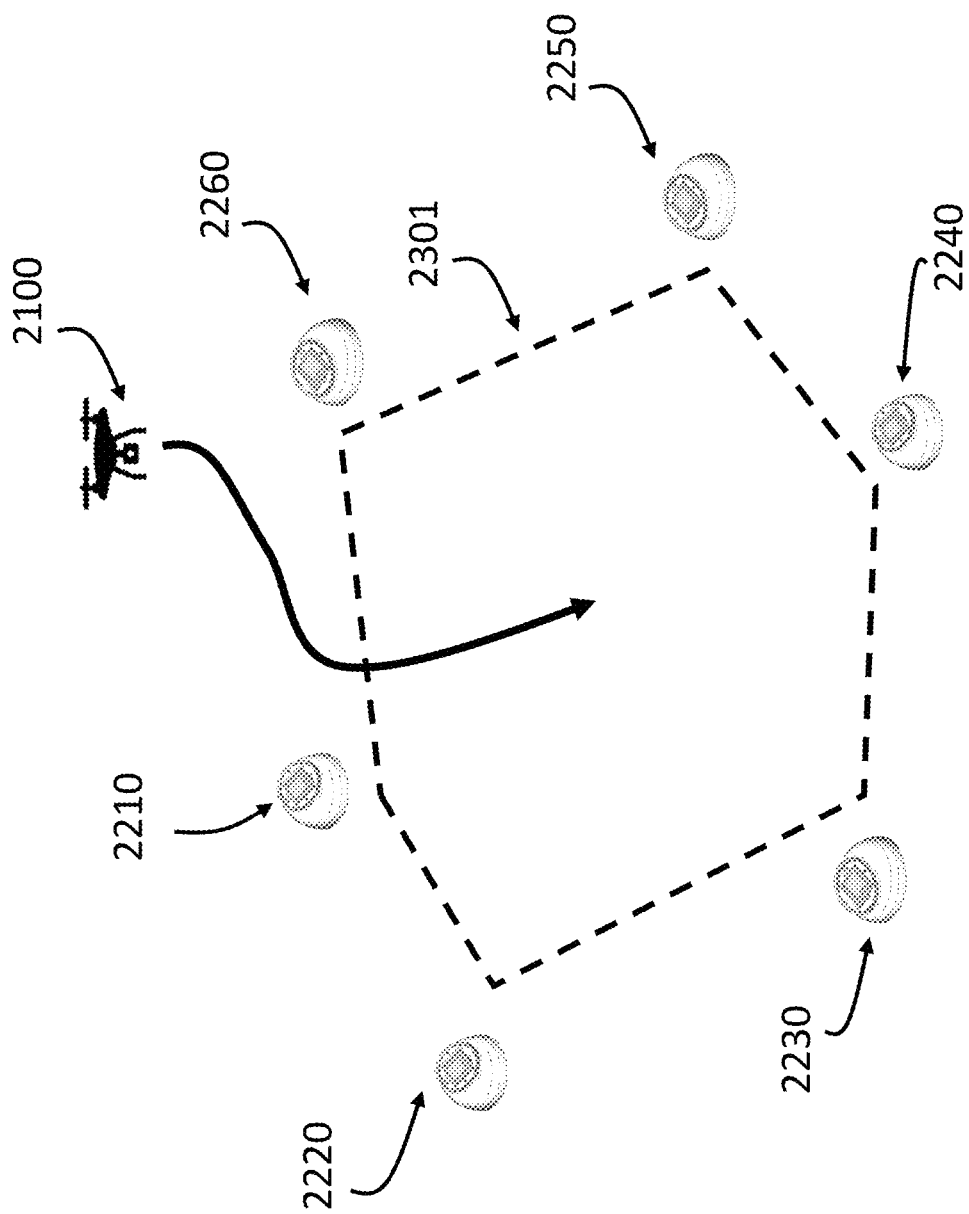

As stated above, the surface-based transmitter system 2200 may include, e.g., at least four RF transmitter nodes. While FIG. 2A illustrates an embodiment in which the surface-based transmitter system 2200 includes four RF transmitter nodes 2210-2240, FIG. 2C illustrates an embodiment in which the surface-based transmitter system 2200 includes at least six RF transmitter nodes, or more specifically RF transmitter nodes 2210, 220, 2230, 2240, 2250, 2260. The RF transmitter nodes 2210-2260 may define corners of a 2D polygon or 3D polygon that delineates the landing zone 2301. In some cases, a centroid of the 2D polygon or 3D polygon may identify a desired landing point within the landing zone 2301.

The RF transmitter nodes 2210-2240 of FIG. 2A or 2210-2260 of FIG. 2C may be deployed in a variety of ways. In one example, the RF transmitter nodes 2210-2240 or 2210-2260 may be deployed at surveyed, well-defined locations around the landing zone 2300. For instance, the RF transmitter nodes 2210-2240 may be evenly spaced or unevenly spaced around the desired landing point, and may have a distance from the landing point that is in a range of, e.g., 100 feet to 200 feet. In some cases, the RF transmitter nodes 2210-2240 may be deployed in an ad-hoc manner. The ad-hoc setup may be especially suitable for establishing a temporary landing zone with minimal setup. The RF transmitter nodes 2210-2240 or 2210-2260 in the above examples may be deployed at locations that have a common altitude, or may be deployed at locations with different respective altitudes. In some instances in which the RF transmitter nodes 2210-2240 are in a GPS-denied environment, the RF transmitter nodes 2210-2240 may be deployed in a manner so that at least two nodes are out of any plane (e.g., no single plane fits through all of the RF transmitter nodes 2210-2240). This can be accomplished by a minimum of four RF transmitter nodes plus one target object (e.g., vehicle). That is, three of the RF transmitter nodes may define an imaginary plane, by being used as locations on the imaginary plane, while the other RF transmitter nodes (e.g., the fourth RF transmitter node) may be above or below that imaginary plane. Installation of the ground node options for proper operations includes the flexibility to install ground nodes on surveyed site position (GPS surveyed location) in an ad hoc perimeter fashion, on un-surveyed (not GPS surveyed) ad hoc site locations around a desired landing perimeter, in a linear fashion to provide linear flight path tracking, on a mobile vessel or ground vehicle to provide recovery of an air vehicle aboard either moving vehicle. Also, the delivery/installation of the nodes can be implemented via airborne vehicle while overhead the LZ. A node can dropped, shot, parachuted, or otherwise guided to each perimeter position to enable landing in conditions where a brownout or whiteout condition might be generated by the VTOL's downwash on the surface that obscures either the pilot's vision or that of image based guidance system automation.

As depicted in FIGS. 2A and 2C, the RF transmitter nodes 2210-2240 or 2210-2260 of the surface-based transmitter system 2200 may be multistatic nodes that are deployed in a multistatic configuration. As stated above, the multistatic configuration may involve the RF transmitter nodes 2210-2240 or 2210-2260 taking turns to output an RF pulse, such that when one of the RF transmitter nodes (e.g., 2210) is in a broadcast/output mode for outputting an RF pulse, the remaining RF transmitter nodes (e.g., 2220-2240, or 2220-2260) is in a receive/detect mode for detecting the RF pulse. The multistatic nodes may be used to determine range information, which may be combined to form a high resolution picture of an airspace above the RF transmitter nodes, or more specifically to form information identifying vehicles or other objects in the airspace. The surface-based transmitter system 2200 and/or the vehicle 2100 in such a scenario may be configured to determine a location of the vehicle 2100 relative to the RF transmitter nodes 2210-2240 or 2210-2260. In some scenarios, the location that is determined for the vehicle 2100 may be a global location, or more generally an absolute location, such as a coordinate which represents a latitude, longitude, and altitude of the vehicle 2100. In such scenarios, the location determination system 2000 may have access to or be configured to determine absolute locations of the RF transmitter nodes 2210-2240 or 2210-2260. In other words, the absolute locations of the RF transmitter nodes 2210-2240 may be known by the location determination system 2000. By determining a location of the vehicle 2100 relative to the absolute locations for the RF transmitter nodes 2210-2240 or 2210-2260, the determined location for the vehicle 2100 may also be an absolute location. In some scenarios, the absolute locations of the RF transmitter nodes 2210-2240 or 2210-2260 may not be known by the location determination system 2000. In such scenarios, the determined location for the vehicle 2100 may still be relative to the RF transmitter nodes 2210-2240 or 2210-2260, or relative to a landing zone 2300/2301 defined by the RF transmitter nodes.

Figure 2D:
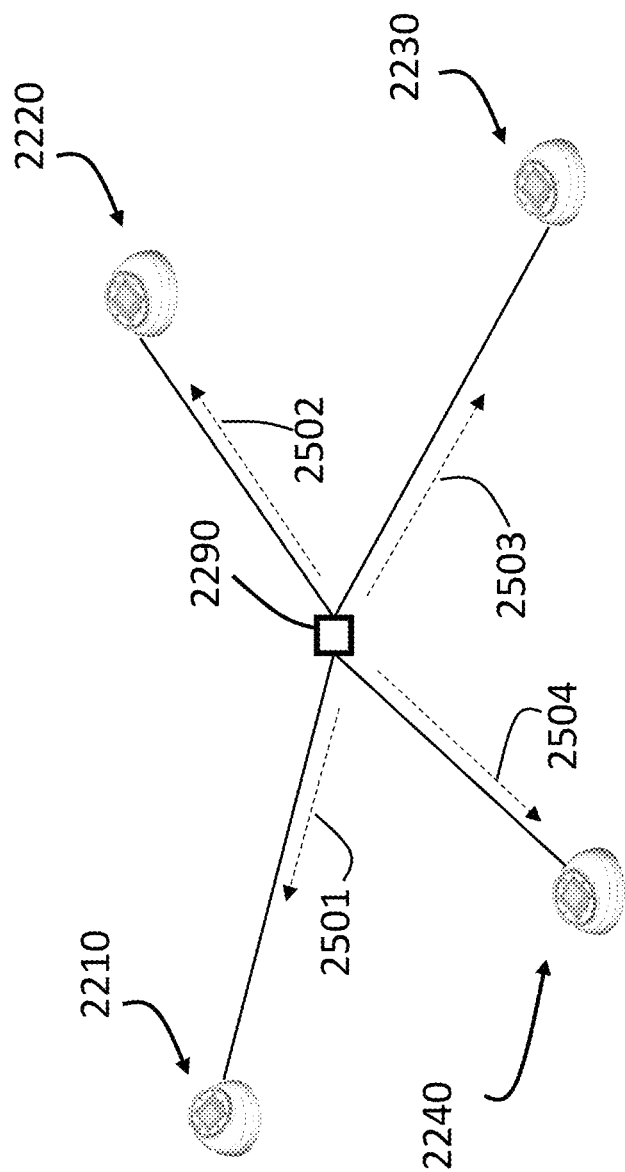

In an embodiment, the surface-based transmitter system 2200 may include a control node. For example, FIG. 2D depicts a control node 2290, which may be an embodiment of the control node 1290 of FIG. 1B. The control node 2290 in this example may be used to, e.g., control pulse timing, or more specifically control when the various RF transmitter nodes 2210-2240 of the system 2200 output a respective RF pulse, and/or to relay information between the RF transmitter nodes 2210-2240. As discussed below in more detail, the pulse timing may be controlled so that the RF transmitter nodes 2210-2240 output a sequence of RF pulses with precise timing and a predefined separation between the RF pulses. The control node 2290 may control the pulse timing via a communication link, such as a wired communication link or wireless communication link, to the RF transmitter nodes 2210-2240. For example, the communication link may include wired segments (e.g., coaxial cables) or wireless links (e.g., microwave links) that communicatively couple the control node 2290 to each of the RF transmitter nodes 2210-2240. In some cases, the communication link may be arranged so as to provide a common signal propagation time from the control node 2290 to the RF transmitter nodes 2210-2240. For instance, the wired segments may have the same length or substantially the same length, so that the propagation times from the control node 2290 to the RF transmitter nodes 2210-2240 are equal or substantially equal. The wired segments or wireless links of the communication link may have a star topology, as illustrated in FIG. 2D, or some other network topology. As an example, FIG. 2E depicts a network topology which has a serial or daisy chain configuration.

In the example depicted in FIG. 2D, the control node 2290 may be configured to transmit or otherwise output one or more synchronization signals, such as synchronization signals 2501, 2502, 2503, 2504, to the RF transmitter nodes 2210-2240. The one or more synchronization signals may trigger the RF transmitter nodes 2210-2240 to output respective RF pulses in response to the one or more synchronization signals. In some cases, the control node 2290 may be configured to send the synchronization signals 2501-2504 at different times, such as points in time that are separated by 10 microseconds. Such a timing may cause the RF transmitter nodes 2210-2240 to output RF pulses which are separated by 10 microseconds in time. In some cases, the control node 2290 may be configured to send the synchronization signals 2501-2504 at the same time. In such cases, the RF transmitter nodes 2210-2240 may receive the synchronization signals 2501-2504 at the same time, but may be programmed to wait different delay periods (e.g., 10 microseconds, 20 microseconds, 30 microseconds, 40 microseconds) before outputting respective RF pulses. As a result, the RF transmitter nodes 2210-2240 may still output RF pulses that are separated by 10 microseconds.

Figure 2E:
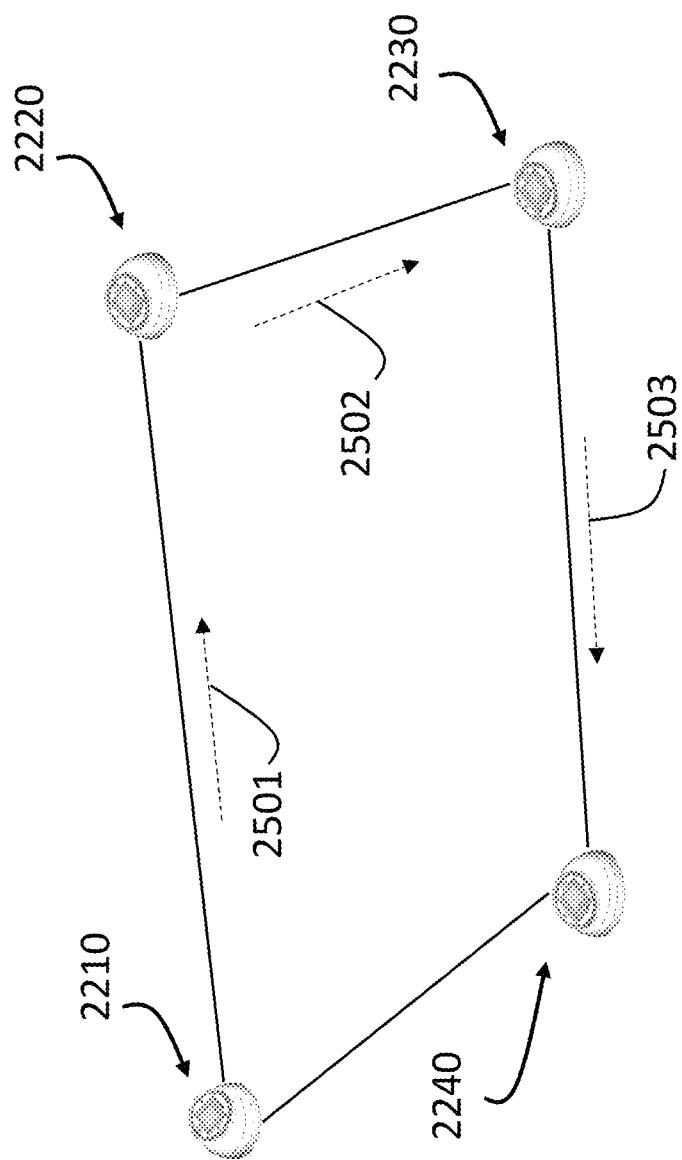

In an embodiment, one of the RF transmitter nodes 2210-2240 may pass a synchronization signal to another one of the RF transmitter nodes 2210-2240 in a daisy chain fashion, as illustrated in FIG. 2E. In this scenario, the RF transmitter nodes 2210-2240 may be communicatively coupled in series, or more particularly may be communicatively coupled via a series of wired segments or wireless links. In this example, the RF transmitter node 2210 may be configured to, e.g., transmit a synchronization signal 2501 to the second RF transmitter node 2220. In some cases, the synchronization signal 2501 may be transmitted about 10 microseconds, or some other delay period, after the RF transmitter node 2210 has outputted a first RF pulse. When the RF transmitter node 2220 receives the synchronization signal 2501, it may in one example immediately output a second RF pulse. In this example, the RF transmitter node 2220 may transmit a synchronization signal 2502 about 10 microseconds later to the RF transmitter node 2230. The RF transmitter node 2230 may output a RF pulse in response to the synchronization signal 2502 and, about 10 microseconds later, transmit a synchronization signal 2503 to the RF transmitter node 2240, which may output a fourth RF pulse in response to the synchronization signal 2503.

Figure 3A:
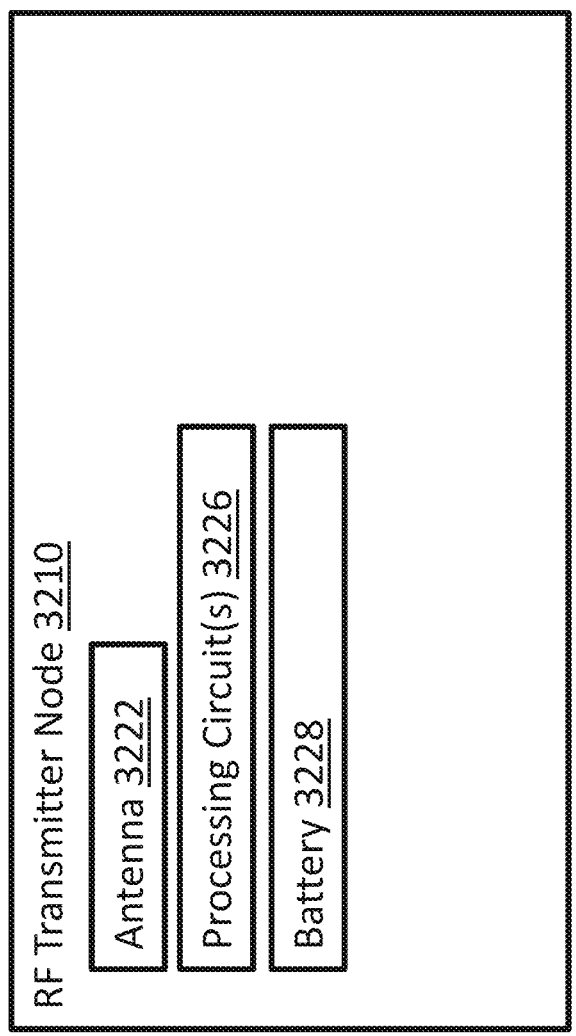
FIGS. 3A and 3B depict block diagrams of a RF transmitter/transceiver node, according to embodiments herein.

As stated above, each of the RF transmitter nodes 2210-2240 may be configured to output an RF waveform, which may also be referred to as an RF wave or RF signal, having a wavefront that propagates outwardly, away from the RF transmitter node. FIG. 3A provides a block diagram of an example RF transmitter node 3210, which may be an embodiment of any of the RF transmitter nodes 1210-1240, or 2210-2260. In the example of FIG. 3A, the RF transmitter node 3210 may include an antenna 3222, at least one processing circuit 3226, and a battery 3228 (or other energy storage device). The battery 3228 may allow the RF transmitter node 3210 to become a portable node, which may facilitate quick deployment and/or re-deployment at various locations. The antenna 3222 may be, e.g., a patch antenna or any other type of antenna, and may be configured to output the RF waveform, which may include, e.g., a radar pulse or any other RF pulse. In some cases, the antenna 3222 may cause a power of the wavefront to cover an angle of, e.g., at least 60 degrees relative to an axis defined by the RF waveform's direction of propagation. In some cases, the outward propagating wavefront may provide hemispherical coverage.

In an embodiment, the at least one processing circuit 3226 may be configured to generate or otherwise determine a shape of an RF waveform, and to provide the generated waveform to the antenna 3222. For example, the at least one processing circuit 3226 may be configured to determine a plurality of waveform values (also referred to as signal values) for the RF waveform, wherein the plurality of waveform values correspond to different points in time. In this example, the at least one processing circuit 3226 may include a digital to analog converter (DAC) and/or a signal amplifier. The determined waveform values may be provided to the DAC and/or to the signal amplifier, which may apply a voltage or current to the antenna 3222 to cause the RF waveform to emanate from the antenna 3222. In some cases, the at least one processing circuit 3226 may be configured to encode data into the RF waveform, such as by applying a modulation scheme, a code (e.g., an orthogonal code), and/or any other encoding technique to the RF waveform. The orthogonal code may be used to encode data, or may be used on a pulse in the RF waveform so as to create a spread spectrum signal that is more resilient against noise. The data encoded into the waveform may include, e.g., transmitting node identifier, current pulse counter, data sets of propagation times and received signal strengths for earlier pulses outputted by all RF transmitter nodes. In an embodiment, the at least one processing circuit 3226 may include a microprocessor, a field programmable gate array (FPGA), an application specific integrated circuit (ASIC), a programmable logic circuit (PLC), or any other processing circuit.

In an embodiment, the at least one processing circuit 3226 may be configured to generate an RF waveform that includes an ultrawideband (UWB) pulse, which may be emitted or otherwise outputted by the antenna 3222. The UWB pulse may, for instance, have a bandwidth that is greater than or equal to 500 MHz, or greater than or equal to 1 GHz, and/or have a duration which is equal to or shorter than 1 nanosecond. In some cases, the UWB pulse may occupy a frequency range from 960 MHz to 10.6 GHz, or from 3.1 GHz to 10.6 GHz. In some cases, the UWB pulse may be used as a radar pulse that may travel from a first RF transmitter node, such as the RF transmitter node 2210, to a vehicle (e.g., 2100) and/or to a second RF transmitter node. In some cases, determining a location of the vehicle may involve determining a difference between a propagation time of the UWB pulse from the first RF transmitter node to the vehicle versus a propagation time of the UWB pulse from the first RF transmitter node to the second RF transmitter node, as discussed below in more detail. The large bandwidth and/or short duration of the UWB pulse may reduce a likelihood of multipath interference. For example, if the multipath interference is caused by interference between a portion of the UWB pulse that directly propagated to a target location (e.g., vehicle location) and a portion of the UWB pulse that indirectly reached the target location by reflecting off a surface (e.g., outer wall of a building), the short duration of the UWB pulse may better ensure that the directly propagated UWB pulse is detected at the target location well before the indirectly propagated UWB pulse arrives at the target location.

Figure 3B:
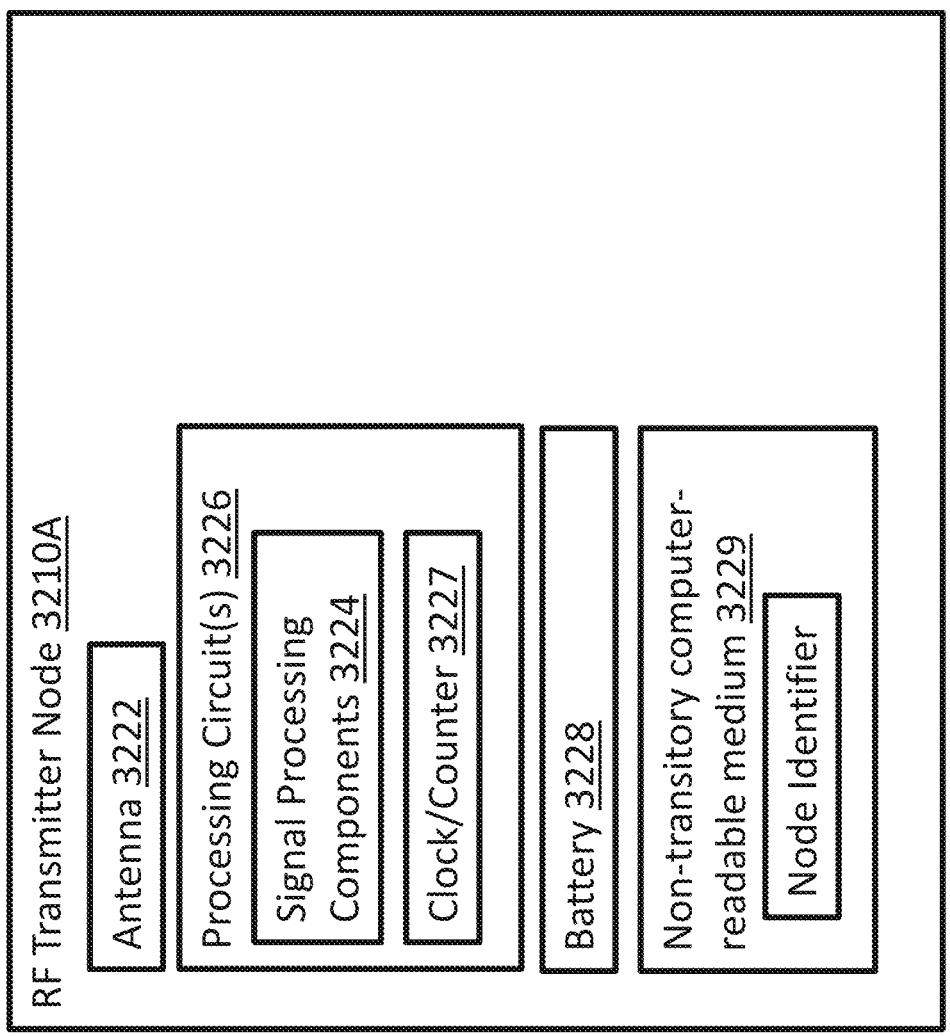

In some cases, an RF transmitter node 3210 may be configured to encode a node identifier and/or a local time into an RF waveform. For example, FIG. 3B illustrates an RF transmitter node 3210A, which may be an embodiment of the RF transmitter node 3210, that further includes a non-transitory computer-readable medium 3229 that stores the node identifier (e.g., Node ID). The non-transitory computer-readable medium 3229 may include any storage device, such as a solid state drive (SSD), a hard disk drive (HDD), random access memory (RAM), or any other storage device. FIG. 3B further depicts the at least one processing circuit 3226 having signal processing components 3224 and a clock or counter 3227. The signal processing components 3224 may be configured to apply various digital signal processing or analog signal processing to an incoming RF waveform or to prepare an RF waveform for outgoing transmission by the antenna 3222. The signal processing may include, e.g., applying a matched filter, pulse compression, a chip sequence or other orthogonal code, or any other signal processing. As depicted in FIG. 3B, the at least one processing circuit 3226, or more generally the RF transmitter node 3210A, may include a clock 3227 or a counter 3227 which operates as a clock. The clock/counter 3227 may be used to track a local time of the RF transmitter node 3210A, such as a time which measures how much time has elapsed since the RF transmitter node 3210A was activated, or how much time has elapsed since the clock/counter was last reset.

Figure 4A:
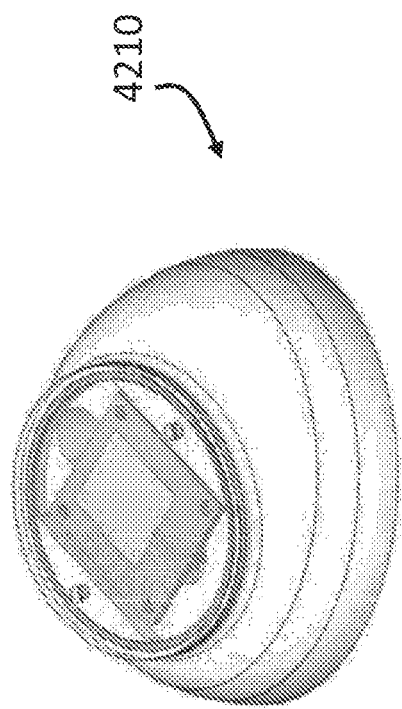
FIGS. 4A-4E depict an example RF transmitter node, according to an embodiment herein.
Figure 4B:
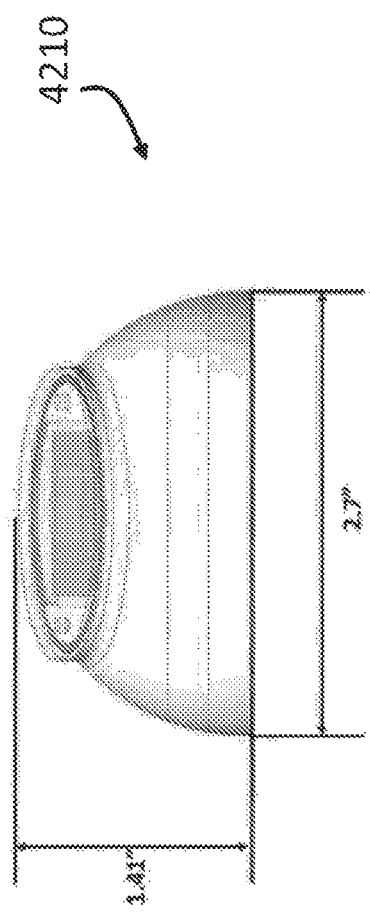
Figure 4C:
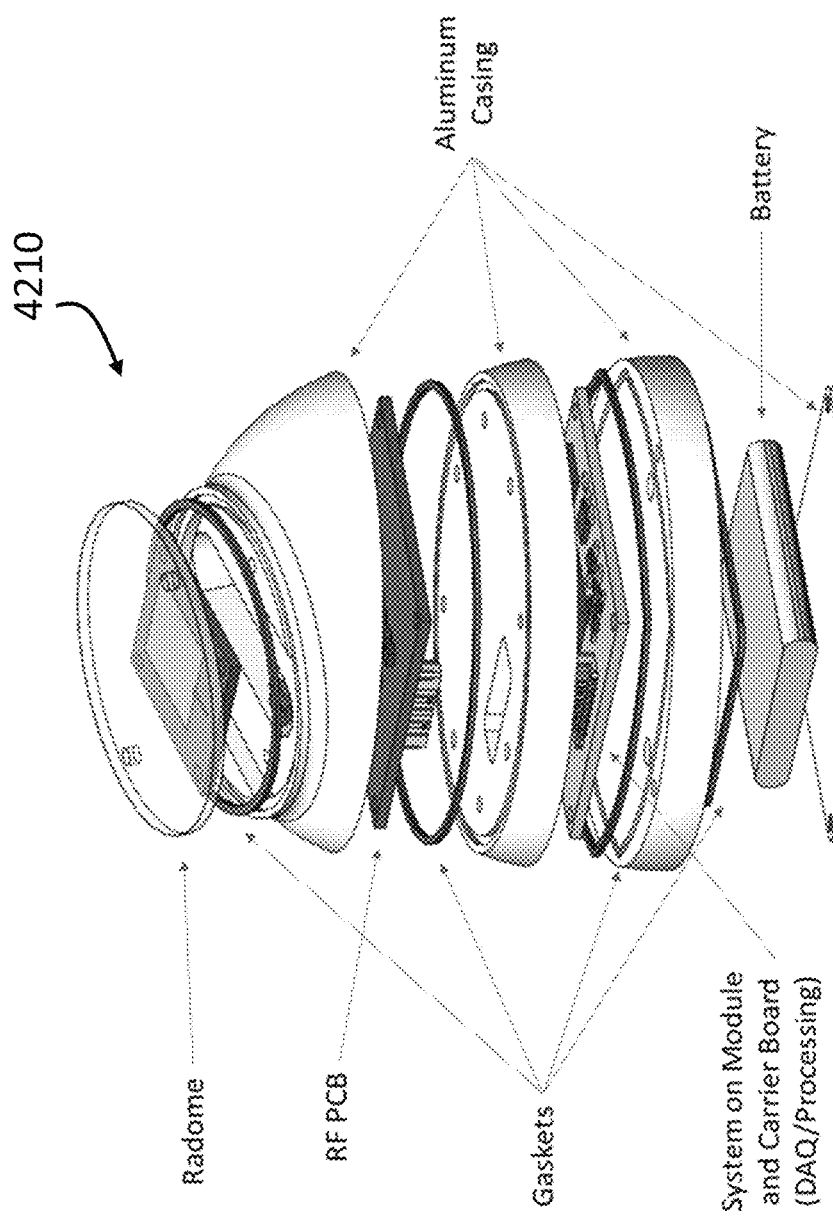
Figure 4D:
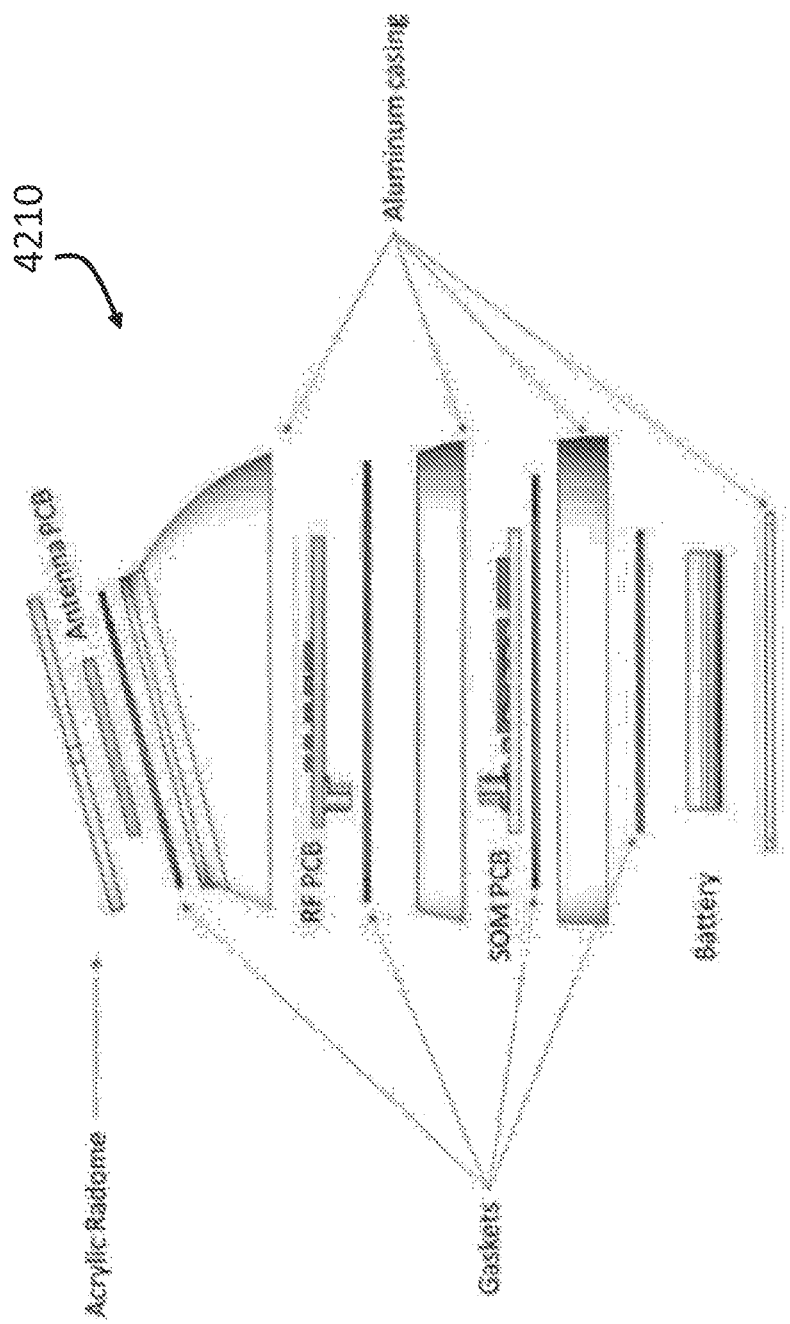

FIGS. 4A-4D illustrate an example physical design for an RF transmitter node 4210, which may be an embodiment of any one of the RF transmitter nodes 1210-1240, 2210-2260, or 3210/3210A. In this example, the RF transmitter node 4210 may have dimensions that are each equal to or less than 5 inches. For instance, the RF transmitter node 4210 may have a height which is about 1.4 inches, and a width of about 2.7 inches. The RF transmitter node 4210 in this example may have a weatherproof housing, and may be configured to generate an upward-pointing antenna pattern with enough off-axis energy or power to be detected by other RF transmitter nodes when they are deployed around a landing zone. As depicted in FIGS. 4C and 4D, the RF transmitter node 4210 may include an aluminum casing formed by several sections that are attached to each other and sealed via gaskets. The casing may form an acrylic radome for an antenna of the RF transmitter node 4210, and may house a battery for the RF transmitter node 4210.

Figure 4E:
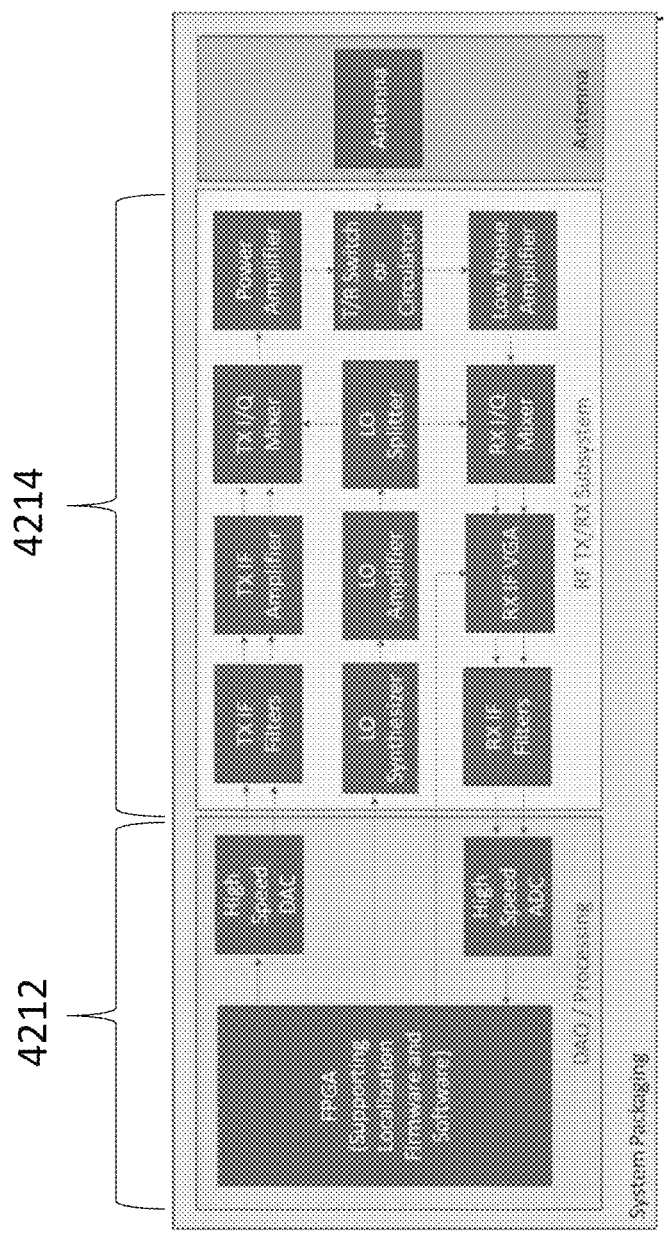

In an embodiment, RF transmitter node 4210 may further include processing circuits that comprise an RF processing module 4212 and a data acquisition (DAQ) and processing module 4214. As illustrated in FIG. 4E, the DAQ and processing module 4212 may include a field processing gate array (FPGA) or other processing circuit that is configured to perform calculations or other steps for determining a location of a vehicle or other target object. The DAQ and processing module 4212 may further include a digital to analog converter (DAC) and an analog to digital converter (ADC). The RF processing module 4214 may include various components, such as frequency filters, mixers, amplifiers, and oscillators, which may process an incoming RF waveform detected by the antenna into a form which is suitable for the DAQ and processing module 4212. The RF processing module 4214 may further be configured to process a RF waveform that is generated by the DAQ and processing module 4212 so that the processed RF waveform is suitable for being broadcasted by the antenna. The processing may, e.g., ensure that the processed RF waveform has an appropriate frequency content and power level (e.g., about 1 W) for broadcast by the antenna.

In an embodiment, determining a location of a vehicle (e.g., 1100/2100) may involve operating in a "Comms" mode or in a "Radar" mode. The Comms mode may include the vehicle (e.g., 2100) being configured as a transceiver that is able to detect RF pulses from the RF transmitter nodes (e.g., 1210-1240/2210-2260). The Comms mode may include an active Comms mode, in which the vehicle outputs a reply pulse in response to a RF pulse, and may include a passive Comms mode, in which the vehicle does not output such a reply pulse. FIG. 5 depicts a vehicle 5100 that can be used in the Comms mode. The vehicle 5100 (which may be an embodiment of the vehicle 1100/2100) may include an antenna 5122 and at least one processing circuit 5126. The antenna 5122 may be configured to detect the RF pulses from the RF transmitter nodes discussed above. The at least one processing circuit 5126 may be configured to perform signal processing on the RF pulses, which may include, e.g., applying frequency filtering, an orthogonal code, demodulation, decoding, and/or any other signal processing. The at least one processing circuit 5126 may further be configured to determine a location of the vehicle 5100 based on the RF pulses, or based on information that is extracted from the RF pulses. In some implementations, the at least one processing circuit 5126 may have access to information that identifies locations of the RF transmitter nodes (e.g., 2210-2260). As an example, FIG. 5 depicts an embodiment in which the vehicle 5100 includes a non-transitory computer-readable medium 5129 (e.g., a solid state drive) that stores information identifying the locations of the RF transmitter nodes. If the RF transmitter nodes are configured to output a sequence of RF pulses, the at least one processing circuit 5126 may have access to information that describes an order in which the RF transmitter nodes output RF pulses in the sequence. Such information may be used by the at least one processing circuit 5126 to determine which RF transmitter node outputted a particular RF pulse. In some cases, the at least one processing circuit 5126 and the antenna 5122 may be used in the Comms mode to output a reply pulse. The reply pulse may be detected by one or more RF transmitter nodes and used for determining a distance between them and the vehicle 5100, as discussed below in more detail.

Figure 6:
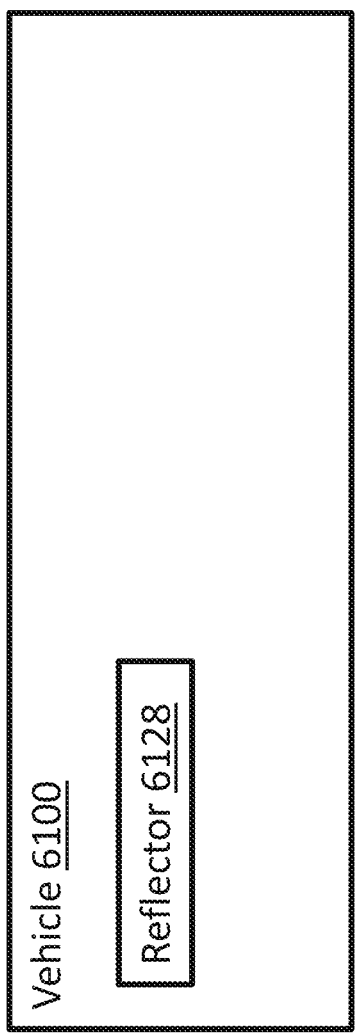
FIG. 6 depicts an example of a vehicle according to an embodiment herein.

In an embodiment, the Radar mode may involve RF transmitter nodes outputting RF pulses, and detecting reflections of the RF pulses off a surface of a vehicle. The detected reflections may be used to determine a location of the vehicle, as discussed below in more detail. The vehicle may remain substantially passive in the Radar mode. In some cases, the vehicle may include a reflector to facilitate reflection of RF pulses. For instance, FIG. 6 illustrates a vehicle 6100 that includes a reflector 6128, which creates a reflecting surface or surfaces for the RF pulses. The reflector 6128 may increase a radar cross section (RCS) of the vehicle 6100, which may increase a signal to noise ratio (SNR) of the reflections when they reach the RF transmitter nodes, so as to increase a detectability of the reflections at the RF transmitter nodes. In some cases, the vehicle 6100 may have multiple surfaces that together form a cubic corner. The vehicle 6100 may have an antenna and/or signal processing circuit, which may remain unused by the Radar mode, or may lack such a component. The radar pulse transmitted by the airborne vehicle may be used to obtain the closest contact to other structures over the antenna coverage pattern. In a flat open LZ, this would function as a radar altimeter while, in an urban environment, it might be a proximity detector for a vertical obstruction, such as a tower or building. In both cases, it presents cautionary information of the proximity of nearby objects and their range.

In an embodiment, the vehicle 5100 or 6100 may include an inertial measurement unit (IMU), which may, for instance, measure an acceleration or velocity of the vehicle 5100/6100. The vehicle 5100/6100 may be configured to use the IMU to make an updated determination of its location, especially during an interval when it is unable to receive RF pulses from the RF transmitter nodes (e.g., 2210-2240), such as during a time span in which the vehicle 5100/6100 is not in a line of sight of the RF transmitter nodes. In such a situation, the vehicle may be configured to, e.g., perform an integration function on acceleration or velocity values during that time span so as to determine a change in location, and make the updated determination based on the change in location.

Figure 7A:
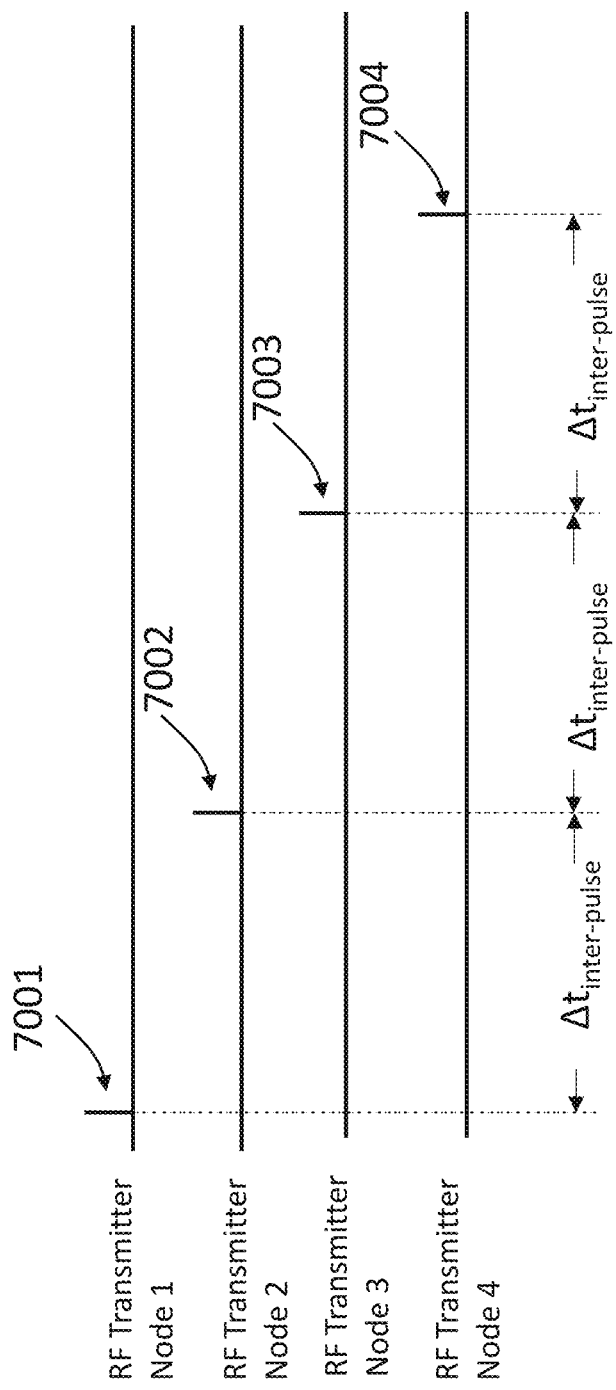

As stated above, one aspect of the present disclosure relates to a plurality of RF transmitter nodes that are configured to output precisely separated pulses, or more specifically a sequence of RF pulses with predefined timing. For example, FIG. 7A illustrates a timing diagram that depicts a sequence of at least four RF pulses 7001, 7002, 7003, 7004 that are outputted by a set of RF transmitter nodes, respectively (e.g., 1210-1240/2210-2240). In this example, the sequence of RF pulses 7001-7004 may be outputted with a predefined inter-pulse delay between each pair of consecutive RF pulses in the sequence. More particularly, the RF pulse 7001 and the RF pulse 7002 may be a first pair of consecutive RF pulses, and may be separated by the predefined inter-pulse delay, as illustrated in FIG. 7A. Similarly, the RF pulse 7002 and the RF pulse 7003 may be a second pair of consecutive RF pulses, while the RF pulse 7003 and the RF pulse 7004 may be a third pair of consecutive RF pulses. The pre-defined inter-pulse delay may separate pulses in the second pair of consecutive RF pulses and separate pulses in the third pair of consecutive RF pulses.

In an embodiment, the inter-pulse delay may be increased to reduce a likelihood of multipath interference between RF pulses. The multipath interference may arise when, e.g., an earlier RF pulse reflects off a feature in its environment, such as a building surface or a side of a hill. In one example, the reflection of the earlier RF pulse may arrive at substantially the same time as a subsequent RF pulse at a receiving antenna, which may cause interference between the reflection and the subsequent RF pulse. The inter-pulse delay may provide time for the earlier RF pulse (e.g., 7001) and its reflections to arrive at a receiving antenna or other location before outputting of the subsequent RF pulse, which may reduce a likelihood of multipath interference.

In an embodiment, the inter-pulse delay may have a value that is longer than 1 microsecond. Such an amount of time may correspond to a round trip distance of 1000 feet. More specifically, such an amount of time may be sufficient for an RF pulse to travel a maximum of about 500 feet from an RF transmitter node to a vehicle, and for a reflection of the RF pulse or for a reply pulse to travel back from the vehicle to the RF transmitter node. In some cases, the location determination system (e.g., 1000/2000) of the embodiments herein may be designed to track vehicles up to a range of 1000 feet, which is greater than the 500 feet allowed by the 1 microsecond delay. Thus, the inter-pulse delay may be longer than 1 microsecond. In some cases, the inter-pulse delay may have a value that is greater than or equal to 10 microseconds.

In the above embodiment, the RF transmitter nodes may operate in a multi static fashion. More particularly, when one of the RF transmitter node switches from a receive/detect mode to a broadcast/output mode, so as to output an RF pulse, all of the other RF transmitter nodes may operate in a receive/detect mode to detect the RF pulse. Further, the RF transmitter nodes may take turns switching to the broadcast/output mode, so as to output the sequence of RF pulses, which may be used to determine a location of a vehicle, such as an aircraft in an airspace above the RF transmitter nodes.

In an embodiment, each of the RF pulses may be an ultrawideband (UWB) pulse. In one example, the UWB pulse may have a bandwidth that is greater than or equal to 1 GHz, and/or a duration that is shorter than or equal to 1 nanosecond. As discussed above, the UWB pulse may further reduce a likelihood of multipath interference. For instance, the multipath interference may arise between a portion of an earlier RF pulse (or its reflection off a feature in its environment) and a portion of a later RF pulse, especially if the RF pulses have long durations that increase a likelihood of their overlap. If the RF pulses have an extremely short duration, there is less likely to be an overlap between the earlier RF pulse and the later RF pulse, because the short duration of the earlier RF pulse causes the entire pulse to arrive and be detected at a target location before the subsequent RF pulse is outputted. In another embodiment, however, a spread spectrum pulse may be created by applying an orthogonal code or pulse compression to generate a pulse. The generated pulse may have a longer duration, but a receiving node may use the orthogonal code to distinguish the pulse from other pulses, or from noise.

In an embodiment, one or more RF transmitter nodes may be configured to output a corresponding RF pulse at a predefined time. For instance, RF Transmitter Node 1 (e.g., 2210) in FIG. 7A may be configured to output the RF pulse 7001 at a predefined time. The predefined time may be an absolute time, such as a time which is equal to or is based on, e.g., coordinated universal time (UTC). In some cases, the predefined time may be made available to the RF transmitter nodes and/or to the vehicle. For example, a database or other non-transitory computer-readable medium (e.g., 3229/5129) may store information which identifies a plurality of predefined times at which the sequence of RF pulses 7001-7004 are to be output. Further, the RF transmitter nodes (e.g., 2210-2240) and/or the vehicle (e.g., 2100) may have access to this information. In such an example, when a RF transmitter node (e.g., 2210) outputs a RF pulse that is detected by the vehicle (e.g., 2100) or by the other RF transmitter nodes (e.g., 2220-2240), the information discussed above may allow the vehicle and/or the other RF transmitter nodes (e.g., 2220-2240) to determine a time at which the RF pulse was outputted. Such a time may correspond to a departure time of the RF pulse from the RF transmitter node (e.g., 2210). The vehicle and/or the other RF transmitter nodes (e.g., 2220-2240) may be configured to determine respective arrival times of the RF pulse at those nodes, and to use the departure time and the arrival times to determine a distance that the RF pulse has traveled from one RF transmitter node to the vehicle, or respective distances the RF pulse has traveled from one RF transmitter node to the other RF transmitter nodes. As discussed below in more detail, these distances may be used to determine a location of the vehicle relative to the RF transmitter nodes.

In some cases, when the RF transmitter nodes are first activated, they may be unsynchronized. These RF transmitter nodes may use an autonomous distributed technique for synchronization, such as a technique based on collision detect multiple access (CDMA). In such a technique, each of the RF transmitter nodes may initially output a pulse and wait for a random time while the RF transmitter node goes into receive/detect mode. If the RF transmitter node detects a pulse from another node, the former RF transmitter node may vary its broadcast timing based on the node identification numbers that the former RF transmitter node has received. In this example, pulses from each RF transmitter node may carry information about all other RF nodes. Using this discovery process, each of the RF transmitter nodes may select an empty time slot and fit into this time slot by broadcasting RF pulses during this time slot. This discovery process may further allow new RF transmitter nodes to be added to a surface-based transmitter system (e.g., 1200/2200), and may further provide for graceful recovery if a RF transmitter node fails.

Figure 7B:
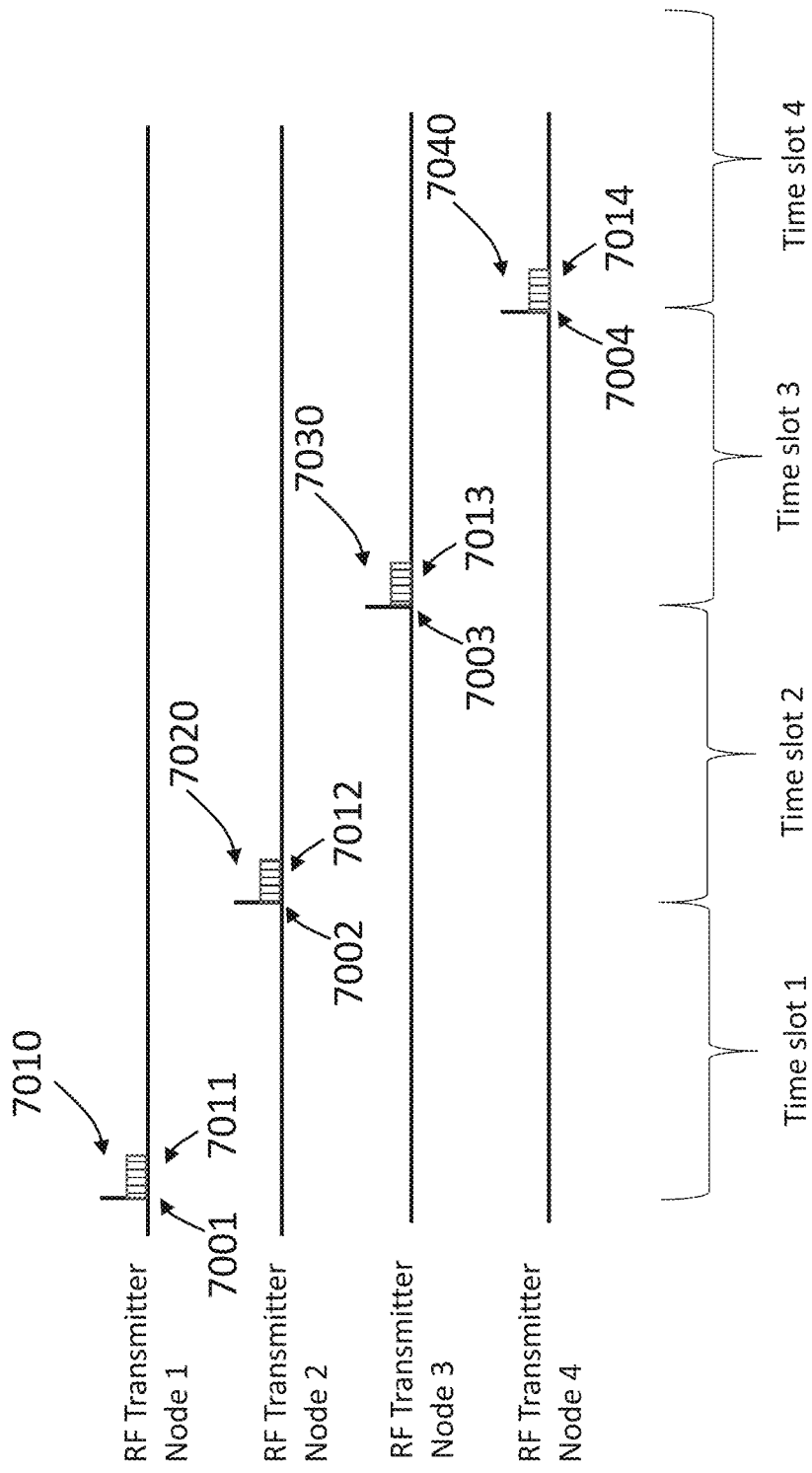
Figure 7C:
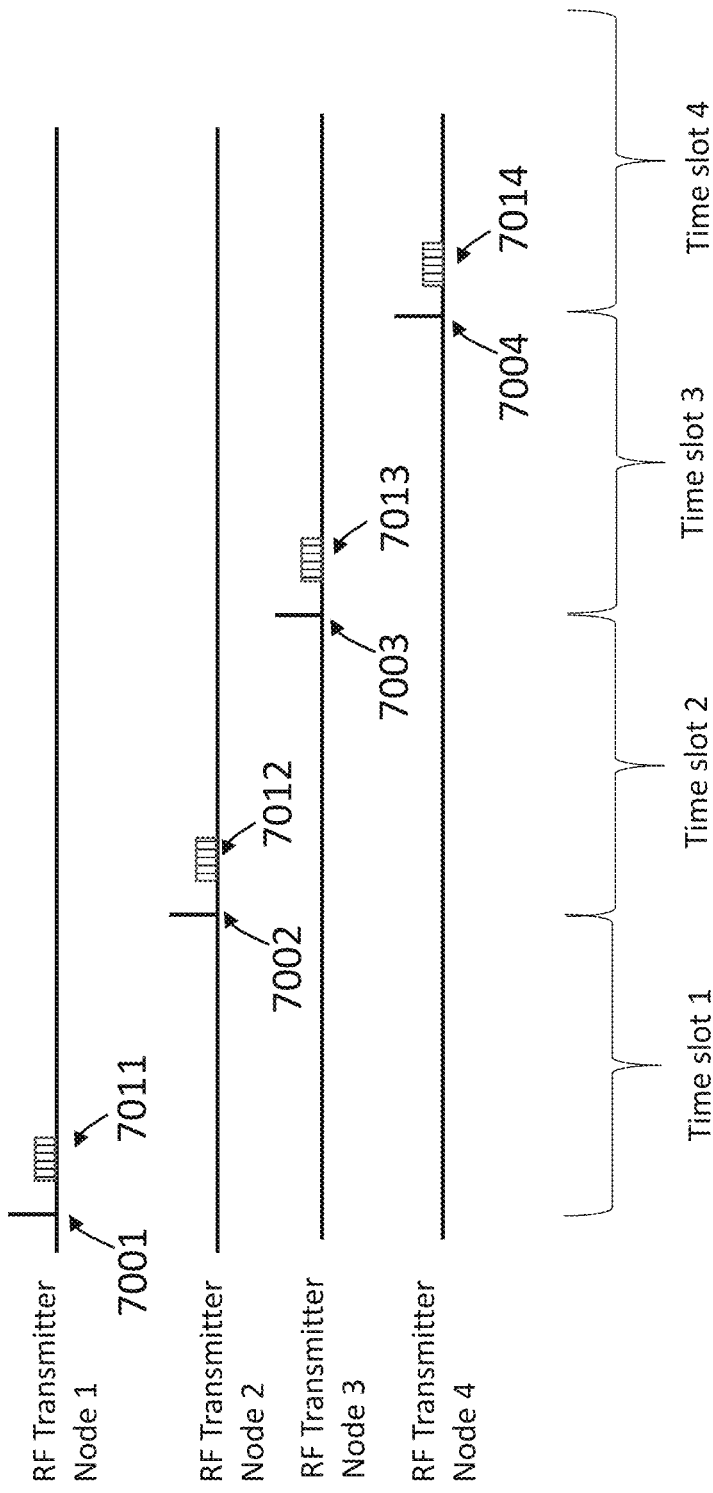

In an embodiment, each RF pulse of the set of RF transmitter nodes may be configured to transmit the sequence of respective RF pulses in a series of respective non-overlapping time slots, such as time slots 1 through 4, which are illustrated in FIG. 7B. Each of the time slots may include an RF waveform that includes only a respective RF pulse, or includes a respective RF pulse and a respective data signal. For example, FIG. 7B depicts an implementation in which each RF transmitter node of a set of RF transmitter nodes (e.g., 2210-2240) is configured to output RF waveforms 7010-7040 in time slots 1 through 4, respectively. The RF waveforms 7010, 7020, 7030, 7040 may each include a respective RF pulse (e.g., 7001/7002/7003/7004) at a beginning of its corresponding time slot, and a data signal (e.g., 7011/7012/7013/7014) that follows the RF pulse. In some cases, each data signal may immediately follow its corresponding RF pulse, as illustrated in FIG. 7B. In some cases, each data signal may be separated from its corresponding RF pulse by a predefined delay, as illustrated in FIG. 7C. This delay may be measured from an end of the corresponding RF pulse and a beginning of the data signal, and may be referred to as a range gate delay. The predefined range gate delay may have a value of, e.g., 2 microseconds, 3 microseconds, or some other value. As depicted in FIGS. 7B and 7C, the data signals 7011-7014 may have a lower transmission power than a transmission power of the RF pulses 7001-7004. The lower transmission power of the data signals 7011-7014 may avoid interference with their corresponding RF pulses 7001-7004, and/or may extend battery life. In some cases, the RF transmitter nodes (e.g., 2210-2240) may be configured to transmit the data signals (e.g., 7011-7014) using a different frequency band, or more generally to have different frequency content, than the corresponding RF pulses (e.g., 7001-7004). In some implementations, the RF transmitter nodes (e.g., 2210-2240) may be configured to process the data signals by applying chip sequences, or more generally orthogonal codes, to the data signals (e.g., 7211-7214), and causing the processed data signals to be outputted. The processing may cause a resulting data signal to be more resilient against noise.

The data signal may encode, carry, or otherwise represent a variety of data types. In one example, the data signal may encode a node identifier for the RF transmitter node (e.g., a node ID). If the RF transmitter node outputs an RF waveform that is detected by another RF transmitter node, the latter RF transmitter node may use the node identifier encoded in the data signal of the RF waveform to determine which RF transmitter node outputted the RF waveform, or more specifically which RF transmitter node outputted a RF pulse in the RF waveform. In some cases, the data signal outputted by an RF transmitter node may encode a node clock value, such as a value represented by the clock/counter 3227 of FIG. 3B. The node clock value may indicate, e.g., a local time at the RF transmitter node when the RF waveform is being outputted, or more specifically when the RF pulse and the data signal of the RF waveform is outputted by the RF transmitter node. More particularly, the data signal outputted by an RF transmitter node may include data sets for time of arrival information (also referred to as propagation time information) and signal strength information for multiple pulses received from all other RF transmitter nodes, including a signal strength of a previous pulse outputted by the RF transmitter node. The number of pulses in each data set will be determined by the maximum number of targets the system can handle. This plus the maximum number of nodes that can operate in a constellation determines the number of bits that each pulse needs to encode. It is expected that a total bitrate in the order of a few kilobits shall be sufficient.

In an embodiment, a vehicle may be configured to generate a reply pulse in response to an RF pulse, such as part of the active Comms mode discussed above. For instance, FIG. 7D illustrates an embodiment in which a vehicle (e.g., 1100/2100/5100) detects each of the RF pulses 7001-7004, and outputs a respective reply pulse 7201/7202/7203/7204 in response to each of the RF pulses 7001-7004. In some cases, each of the reply pulses 7201-7204 may have a precise timing relative to a detected RF pulse 7001/7002/7003/7004. For example, the vehicle in FIG. 7D may be configured to output a reply pulse exactly 50 nanoseconds after detecting an RF pulse. When the vehicle outputs a reply pulse (e.g., 7201) in response to an RF pulse, an RF transmitter node which detects the reply pulse may use the precise timing to determine a distance from the RF transmitter node to the vehicle, as discussed below in more detail.

In an embodiment, the data signals (e.g., 7011-7014) discussed above may be used to relay data, by encoding content carried by an earlier RF pulse, or by an earlier reply pulse. For example, an RF transmitter node (e.g., 2210) may be configured to encode various data in the RF waveform 7010, such as data describing a node clock value describing a local time at the RF transmitter node and/or a node identifier for the RF transmitter node. When this data signal is received by the vehicle (e.g., 2100), the vehicle may be configured to output a reply pulse with a data signal that encodes the received data, so as to relay the data to recipients of the reply pulse. In this example, the reply pulse may further include, e.g., a vehicle clock value describing a local time at the vehicle, and a received signal strength of the RF waveform 7010.

Figure 7E:
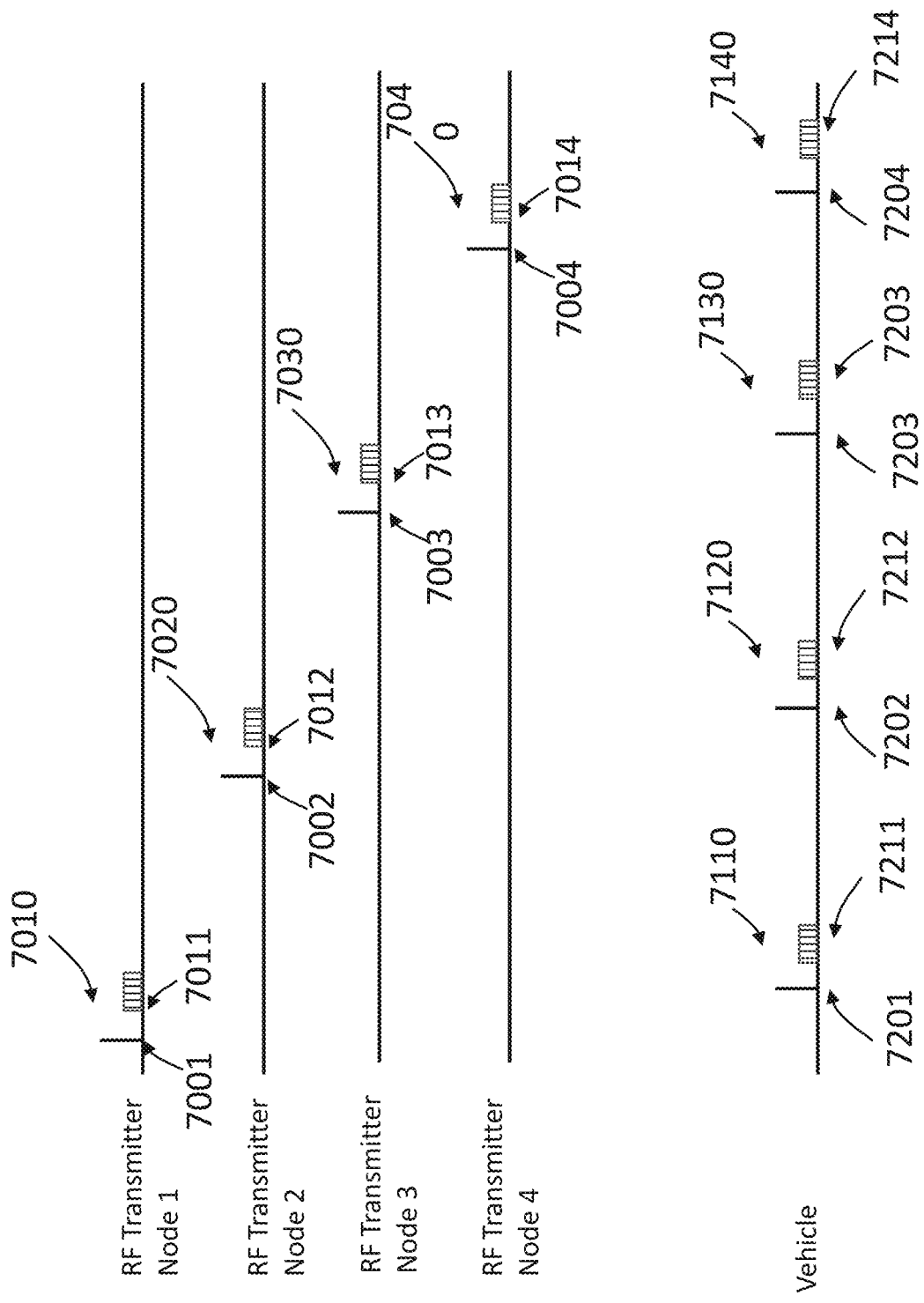

In an embodiment, the vehicle may be configured to output a reply waveform that includes only a reply pulse, as illustrated in FIG. 7D, or that includes the reply pulse and a data signal which follows the reply pulse, as depicted in FIG. 7E. More specifically, FIG. 7E illustrates the vehicle outputting reply waveforms 7110, 7120, 7130, 7140 in response to the RF waveforms 7010-7040, respectively, outputted by RF transmitter nodes (e.g., 2210-2240). The reply waveforms 7110-7140 may include the reply pulses 7201-7204 and respective data signals 7211, 7212, 7213, 7214 that follow the reply pulses. The data signals 7211-7214 may encode, for instance, a local time at the vehicle at which a previous RF pulse was detected. For instance, the data signal 7212 may encode when the RF pulse 7002 was detected.

In an embodiment, the sequence of RF pulses in FIGS. 7A-7E may be repeated. The repeating sequences may be separated by a predefined inter-sequence interval, such as an interval greater than or equal to 10 milliseconds. The inter-sequence interval may be an amount of time between, e.g., an earliest pulse of one sequence and an earliest pulse of a next consecutive sequence. In the above examples, the RF pulses 7001-7004 may each be, e.g., a rectangular pulse, a sinc pulse, or a Gaussian pulse. In some cases, the RF pulse may be followed by a baseline power level, such as a power level associated with ambient noise. In some cases, the RF pulse may be followed by a data signal, as discussed above.

Figure 8A:
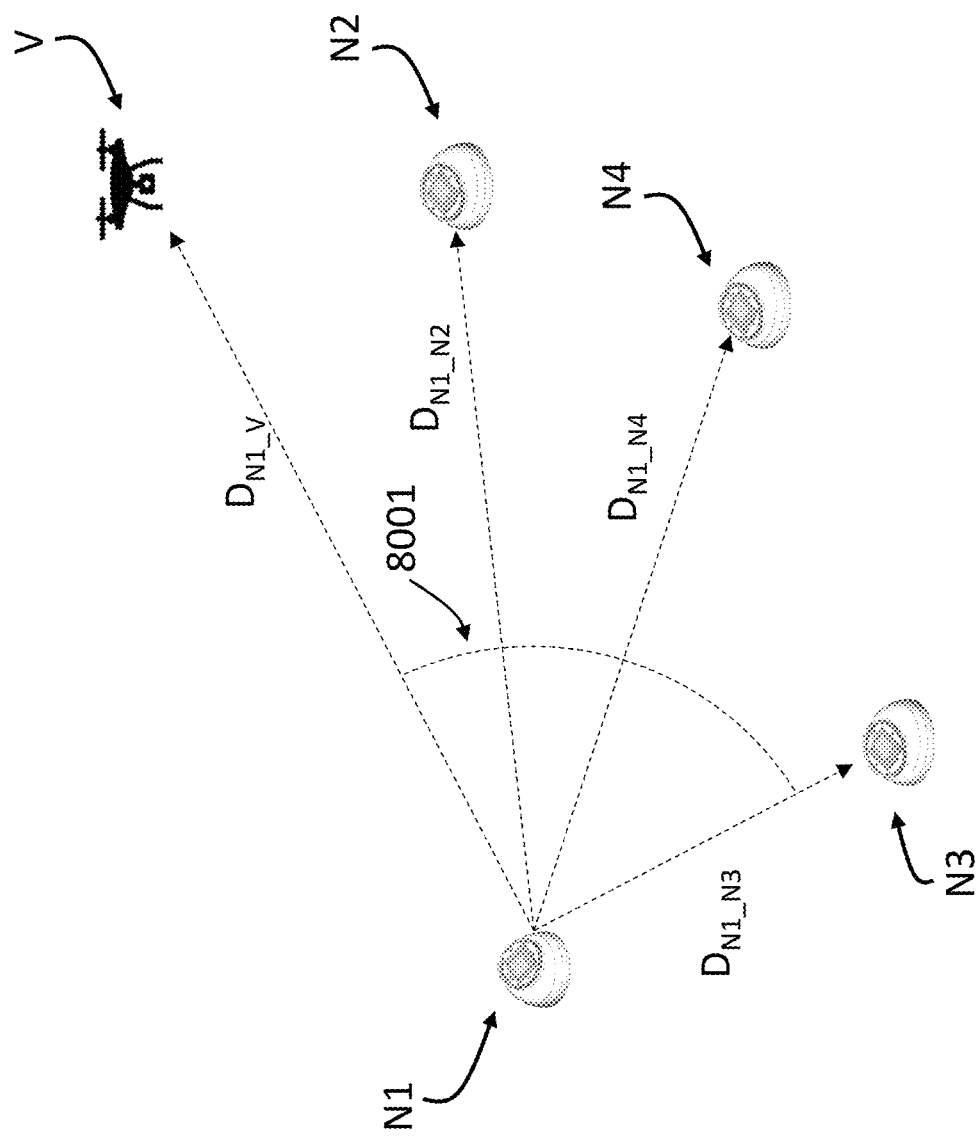

FIGS. 8A and 8B illustrate a method of determining a location of a vehicle V using RF pulses. The vehicle V may be, e.g., a VTOL aircraft in an airspace above RF transmitter nodes N1-N4. The transmitter nodes N1 through N4 may be, e.g., the RF transmitter nodes 1210-1240, respectively, of FIG. 1A, or the RF transmitter nodes 2210-2240, respectively, of FIGS. 2C and 2D, or some other set of RF transmitter nodes. In the example scenario depicted in FIG. 8A, the RF transmitter node N1 may output a RF pulse 8001 (e.g., a UWB pulse). The RF pulse 8001 may be output as part of the Comms mode or the Radar mode discussed above. FIG. 8A further depicts a wavefront of the RF pulse 8001, which may reach other RF transmitter nodes, namely RF transmitter nodes N2 through N4, and may reach a vehicle V, such as a VTOL aircraft in an airspace above the RF transmitter nodes N1-N4. More specifically, FIG. 8B provides a timing diagram which illustrates the RF pulse 8001 being broadcasted or otherwise outputted at $t_{departure,N1}$, and arriving at the vehicle at $t_{arrival,N1\_V}$, and arriving at the other RF transmitter nodes N2 through N4 at times $t_{arrival,N1\_N2}$ through $t_{arrival,N1\_N4}$. In an embodiment, the detecting the RF pulse 8001 at the RF transmitter nodes N2 through N4 and/or at the vehicle V may involve the use of a matched filter and/or an orthogonal code.

In the passive Comms mode, the vehicle V may be configured to determine a distance $D_{N1,V}$ between itself and the RF transmitter node based on a time difference between when the RF pulse 8001 was outputted ($t_{departure,N1}$) by the RF transmitter node N1 and when the RF pulse 8001 is detected at the vehicle V ($t_{arrival,N1\_V}$). For instance, the vehicle may be configured to determine the distance $D_{N1,V}$ to be equal to or based on a speed of pulse propagation (e.g., speed of light) multiplied by $t_{arrival,N1\_V}-t_{departure,N1}$. Additionally in the passive Comms mode, the RF transmitter nodes N2 through N4 may output their own respective RF pulses, and the vehicle V may determine respective distances between itself and the RF transmitter nodes N2 through N4 in a similar fashion. Further, the vehicle V may have access to information which identifies respective locations of the RF transmitter nodes N1 through N4. Based on this information, and the respective distances between the vehicle V and the RF transmitter nodes N1 through N4, the vehicle V may be configured to determine its location relative to the RF transmitter nodes N1 through N4.

In the passive Comms mode or the active Comms mode (or in the Radar mode), the RF pulses outputted by the RF transmitter nodes N1 through N4 may in an embodiment be a sequence of RF pulses separated by an inter-pulse delay of, e.g., at least 10 microseconds. In some instances, the vehicle V may determine, for each RF pulse in the sequence of RF pulses, which RF transmitter node outputted the RF pulse based on an order of the RF pulse in the sequence. For example, it may determine that the earliest RF pulse in the sequence is outputted by the RF transmitter node N1, that the second earliest RF pulse in the sequence is outputted by the RF transmitter node N2, that the second to last RF pulse in the sequence is outputted by the RF transmitter node N3, and that the last RF pulse is outputted by the RF transmitter node N4. In some instances, each of the RF pulses is followed by a respective data signal that encodes a node identifier of a RF transmitter node which outputted the RF pulse. In such instances, the vehicle V may be configured to extract the node identifier from the data signal. The node identifier may be used to determine a location from which the RF pulse was outputted. More particularly, the node identifier may be associated with node location information in a database or other storage device, which may indicate a location of the RF transmitter node that outputted the RF pulse. The location of the vehicle V (also referred to as vehicle location) may be determined based on the node location information.

For example, the vehicle V may determine respective propagation times (also referred to as times of arrival) of the RF pulses from the outputting RF transmitter nodes to the vehicle. The propagation time for a RF pulse may be a difference between when the RF pulse is outputted by an RF transmitter node and when the RF pulse is received or otherwise detected by the vehicle. In some cases, the RF transmitter nodes may output the RF pulses at predefined times, and the vehicle may store or otherwise have access to information which describes this timing. In such cases, the vehicle V may use such timing information to determine when a particular RF pulse was outputted by a corresponding RF transmitter node. In this example, the vehicle V may use the propagation times to determine respective distances (also referred to as ranges) between itself and the RF transmitter nodes. For instance, it may determine the respective distances by multiplying the propagation times by a speed of propagation (e.g., speed of light). The vehicle V may further determine, as the vehicle location, a location which has the respective distances from the RF transmitter nodes. In some cases, this location may be an intersection of multiple imaginary spheres centered about the respective RF transmitter nodes, wherein each of the imaginary spheres has a radius equal to a corresponding one of the respective distances. More particularly, the respective distance is a distance between the corresponding RF transmitter nodes and the vehicle V. If the node location information for multiple RF transmitter nodes indicate their global coordinates (e.g., latitude, longitude, and altitude), then the vehicle location that is determined may also be a global coordinate, which is relative to the global coordinates of the RF transmitter nodes.

Figure 8C:
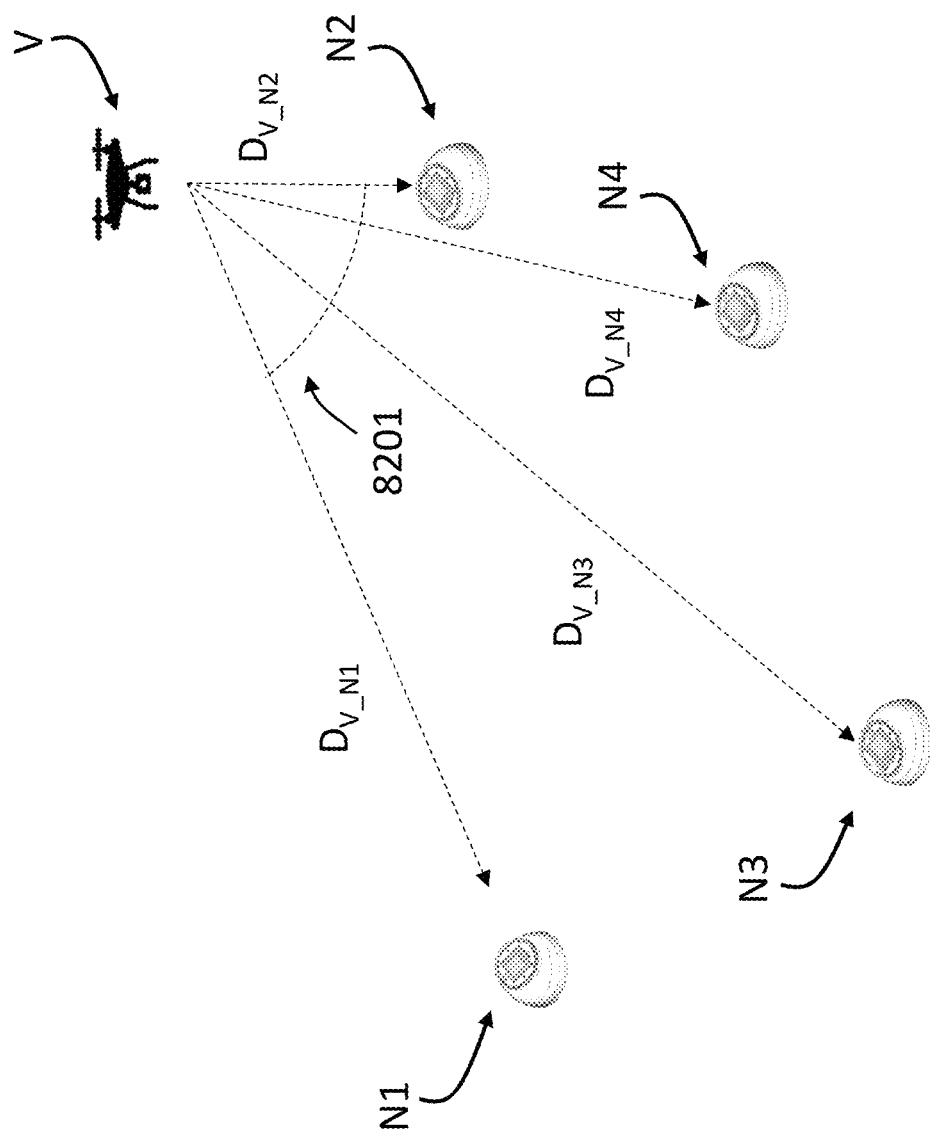
Figure 8D:
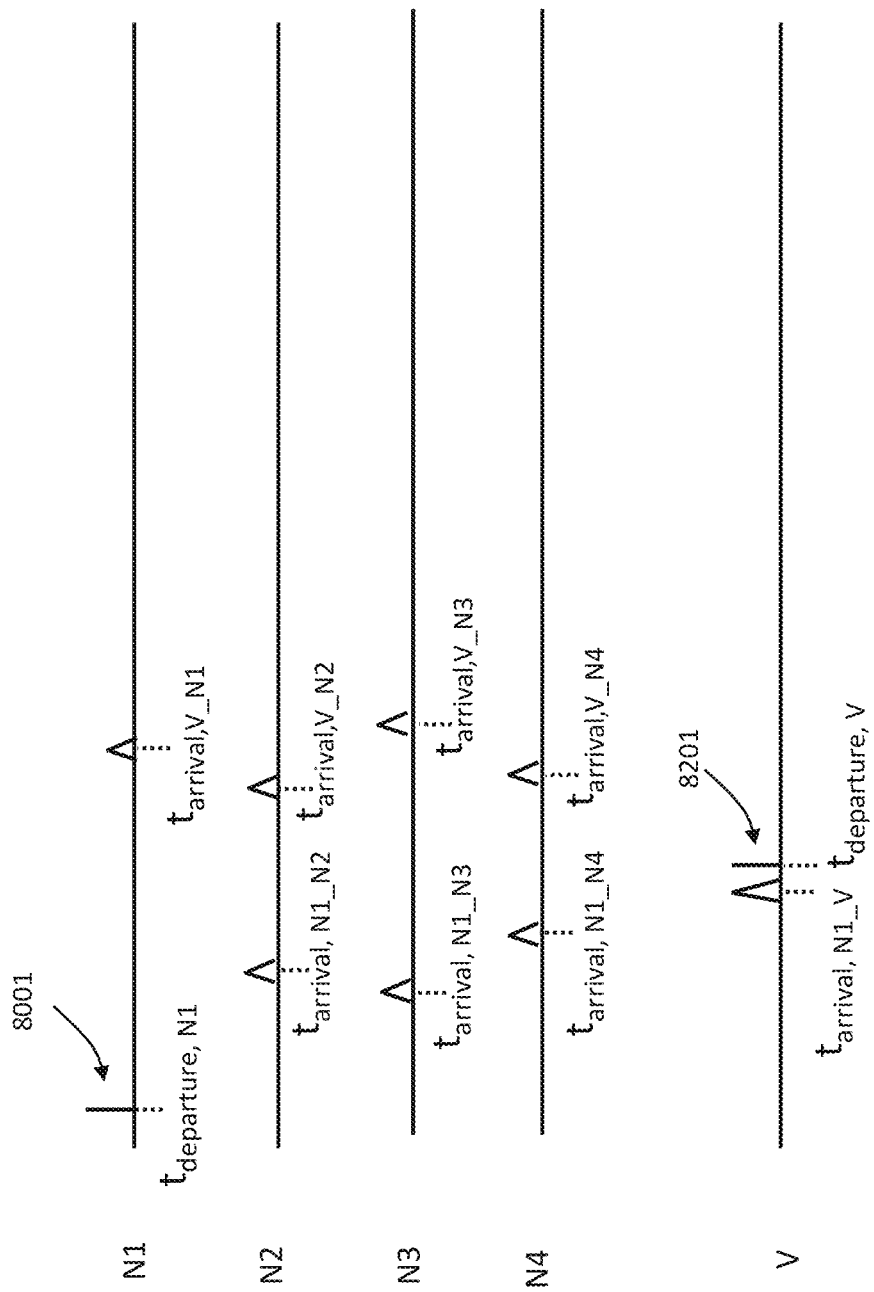

In the active Comms mode, the vehicle V may be configured to output a reply pulse in response to detecting a RF pulse. For instance, FIG. 8C depicts a wavefront of a reply pulse 8201 that is output by the vehicle V in response to detecting the RF pulse 8001. The reply pulse 8201 may be output immediately after detecting the RF pulse 8001 or, as illustrated in FIG. 8D, may be output after a predefined switch delay (e.g., 50 nanoseconds) for switching the vehicle V from a receive/detect state to a transmit/broadcast state. FIG. 8D further depicts the reply pulse 8201 being detected at the RF transmitter nodes N1 through N4.

In the above example of the active Comms mode, the RF transmitter node N2, the RF transmitter node N3, and the RF transmitter node N4 may detect the RF pulse 8001 outputted by the RF transmitter node N1, and detect the reply pulse 8201. Further, the RF transmitter node N1 may also be configured to detect the reply pulse 8201. In some cases, the location of the vehicle V may be determined based on when the RF pulse is detected by the RF transmitter nodes N2, N3, and N4, and when the reply pulse is detected by the RF transmitter nodes N1 through N4. More specifically, the RF transmitter nodes N1 through N4 may use a difference in propagation times (also referred to as times of arrival) to determine the location of the vehicle. One set of propagation times may measure a direct signal propagation path of the RF pulse 8001 from the RF transmitter node N1 to the other RF transmitter nodes N2 through N4. Another set of propagation times may measure an indirect signal propagation path from the RF transmitter node N1 to the other RF transmitter nodes N2 through N4. The indirect signal propagation path may involve the RF pulse 8001 propagating from the RF transmitter node N1 to the vehicle V, and causing the vehicle V to output a reply pulse that propagates from the vehicle V to the other RF transmitter nodes N2 through N4.

For instance, the RF transmitter node N2 may be configured to determine a first propagation time that is equal to or based on $t_{arrival,N1\_N2} - t_{departure,N1}$. As depicted in FIG. 8B, this first propagation time may represent a direct signal propagation path for the RF pulse 8001 from the RF transmitter node N1 to the RF transmitter node N2. More particularly, this first propagation time may be equal to or based on $D_{N1\_N2}/c$, as illustrated in FIG. 8A, wherein c may be a speed of signal propagation (e.g., speed of light). In some cases, if the RF transmitter nodes N1 through N4 are placed at surveyed or otherwise known locations, the RF transmitter nodes N1 through N4 may have access to coordinates or other information identifying these locations, and may be configured to calculate $D_{N1\_N2}$ (or $D_{N1\_N3}$, or $D_{N1\_N4}$) based on these known coordinates.

In this example, the RF transmitter node N2 may further be configured to determine a second propagation time that is equal to or based on $t_{arrival,V\_N2} - t_{departure,N1}$. As illustrated in FIG. 8D, the second propagation time may represent an indirect signal propagation path for the RF pulse 8001 to propagate from the RF transmitter node N1 to the vehicle V, and to cause the vehicle V to output a reply pulse which propagates to the RF transmitter node N2. More particularly, as illustrated in FIG. 8C, the second propagation time may be based on $D_{N1\_V}/c + D_{V\_N2}/c$, which may be equal to $D_{V\_N1}/c + D_{V\_N2}/c$ (because $D_{N1\_V}$ may be equal to $D_{V\_N1}$). In some instances, the second propagation time may be further include the predefined switch delay discussed above, which describes an amount of time between when the vehicle V is in a receive/detect state to detect the RF pulse 8001 and when the vehicle V switches to a transmit/broadcast state to output the reply pulse 8201 (e.g., $D_{N1\_V}/c + D_{V\_N2}/c + 50$ nanoseconds).

Figure 8E:
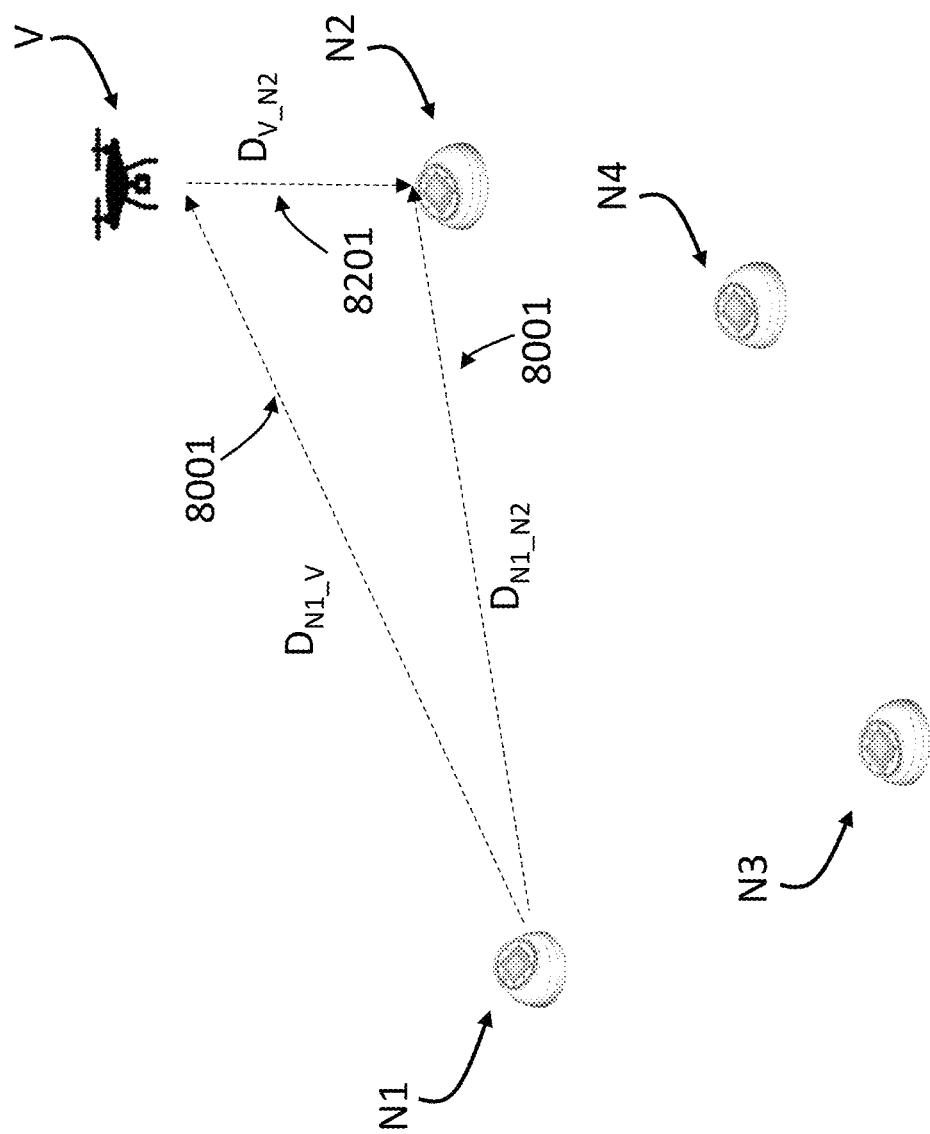

In the above example, the RF transmitter node N2 may be configured to determine a difference d(N1,N2) between the first propagation time and the second propagation time. The first propagation time represents the direct propagation path, and may be based on $D_{N1\_N2}/c$, as illustrated in FIG. 8E. The second propagation time represents the indirect signal propagation path, and may be based on $D_{N1\_V}/c + D_{V\_N2}/c$, or $D_{N1\_V}/c + D_{V\_N2}/c +$ switch delay. Thus, the difference d(N1,N2) may be based on the equation $d(N1,N2) = D_{N1\_V}/c + D_{V\_N2}/c - D_{N1\_N2}/c$, or $d(N1,N2) = D_{N1\_V}/c + D_{V\_N2}/c +$ switch delay $- D_{N1\_N2}/c$. In some cases, the RF transmitter node N3 may be configured to determine a difference d(N1,N3), and the RF transmitter node N4 may be configured to determine a difference d(N1,N4). The difference d(N1,N3) may indicate a difference in a propagation time for a direct signal propagation path from the RF transmitter node N1 to the RF transmitter node N3, and another propagation time for an indirect signal propagation path which involves the vehicle V. The difference d(N1,N4) may similarly indicate a difference in propagation time for a direct signal propagation path from the RF transmitter node N1 to the RF transmitter node N4, and another signal propagation time for n indirect signal propagation path involving the vehicle V. In some cases, the difference d(N1,N3) may be based on the equation $d(N1,N3) = D_{N1\_V}/c + D_{V\_N3}/c - D_{N1\_N3}/c$, and the difference $d(N1,N4)$ may be based on the equation $d(N1,N4) = D_{N1\_V}/c + D_{V\_N4}/c - D_{N1\_N4}/c$. These equations may in some implementations be modified to incorporate the predefined switch delay.

In some implementations, the RF transmitter nodes N1 through N4 may be configured to share values of d(N1,N2), d(N1,N3), and d(N1,N4), so as to have access to all of the above equations and to solve them. For example, if the RF transmitter nodes N1 through N4 are communicatively coupled via the control node 2290 of FIG. 2D in a star network topology, the control node 2290 may be configured to relay such information between the RF transmitter nodes. The control node 2290 or at least one of the RF transmitter nodes N1 through N4 may be configured to construct a matrix based on the values of d(N1,N2), d(N1,N3), and d(N1,N4), and use the matrix to solve for respective distances between the vehicle V and the RF transmitter nodes. More particularly, the matrix may be used to solve for $D_{V\_N2}$, $D_{V\_N3}$, and $D_{V\_N4}$.

In some cases, the RF transmitter node N1 may be configured to determine a distance $D_{V\_N1}$ between itself and the vehicle V, and use this distance $D_{V\_N1}$ to solve the above equations. For example, the distance $D_{V\_N1}$ may be determined based on $t_{arrival,V\_N1} - t_{departure,N1}$, which represents a round trip time in which the RF pulse 8001 propagates from the RF transmitter node N1 to the vehicle V, and causes the vehicle V to output the reply pulse 8201 which propagates from the vehicle V back to the RF transmitter node N1, as illustrated in FIGS. 8A-8D. In one example, the distance $D_{V\_N1}$ may be equal to or based on $(t_{arrival,V\_N1} - t_{departure,N1})/2$ or $(t_{arrival,V\_N1} - t_{departure,N1} - $ switch delay$)/2$). The RF transmitter nodes N1 through N4 may share this value, which may be used to solve the above equations to determine $D_{V\_N2}$, $D_{V\_N3}$, and $D_{V\_N4}$.

In the above example, the control node 2290 or at least one of the RF transmitter nodes N1 through N4 may be configured to use the distances $D_{V\_N1}$, $D_{V\_N2}$, $D_{V\_N3}$, and $D_{V\_N4}$ to determine a location of the vehicle V relative to the RF transmitter nodes N1 through N4. For instance, the location of the vehicle V may be determined as a location which is at an intersection of four imaginary spheres that are centered around the RF transmitter nodes N1 through N4, wherein the spheres may have respective radii of $D_{V\_N1}$, $D_{V\_N2}$, $D_{V\_N3}$, and $D_{V\_N4}$, respectively.

While the above example of the active Comms mode involves the RF transmitter nodes N1 through N4 communicating with each other to share the values d(N1,N2), d(N1,N3), and d(N1,N4) or other information, so as to have access to all of the equations and to solve for a location of the vehicle V, another example of the active Comms mode may involve determining the location of the vehicle V without communication between the RF transmitter nodes N1 through N4. Such an example may involve at least the RF transmitter node N1 detecting RF pulses outputted by the other RF transmitter nodes N2 through N4, and detecting reply pulses to those RF pulses. The RF transmitter node N1 may be configured to determine a location of the vehicle V based on the detected RF pulses and the reply pulses.

Figure 9A:
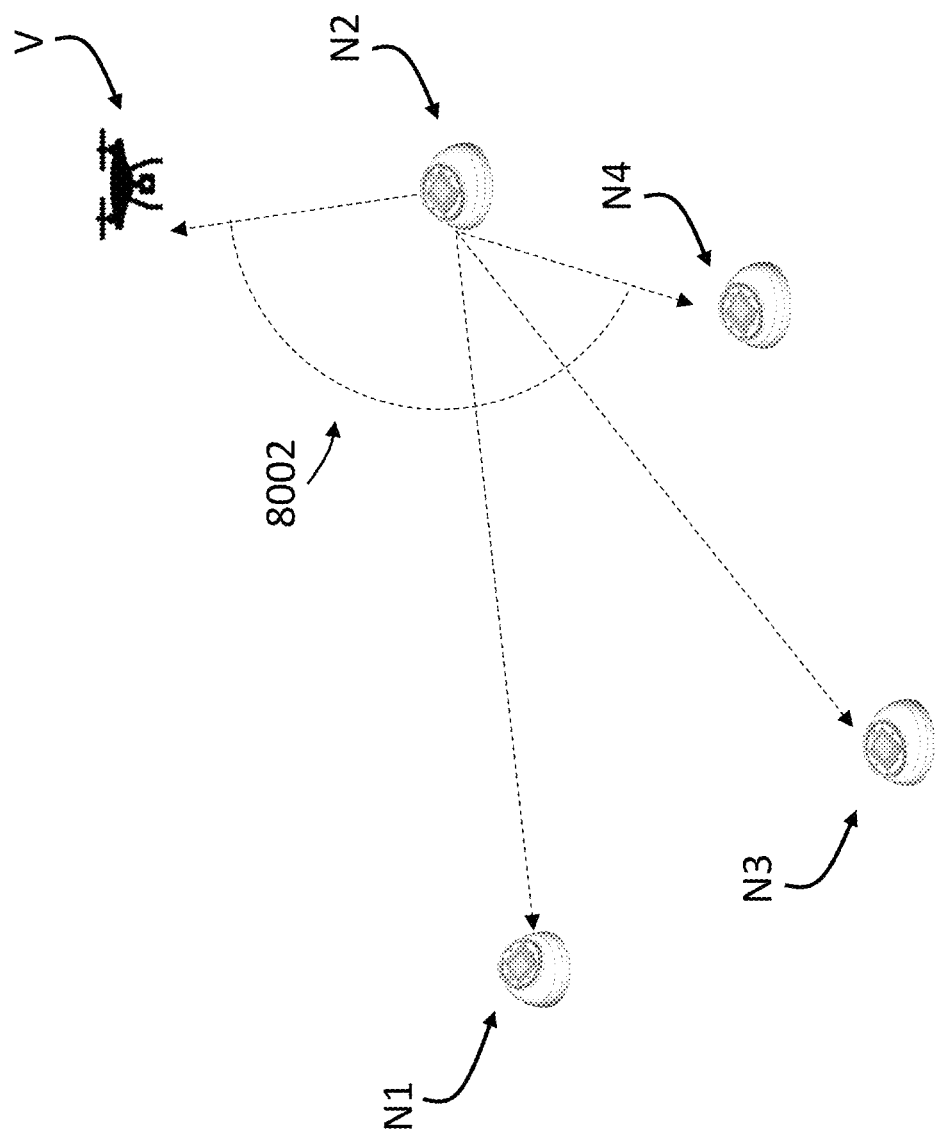
FIGS. 9A-9E illustrate the use of RF pulses to determine a location of a vehicle, according to embodiments herein.
Figure 9B:
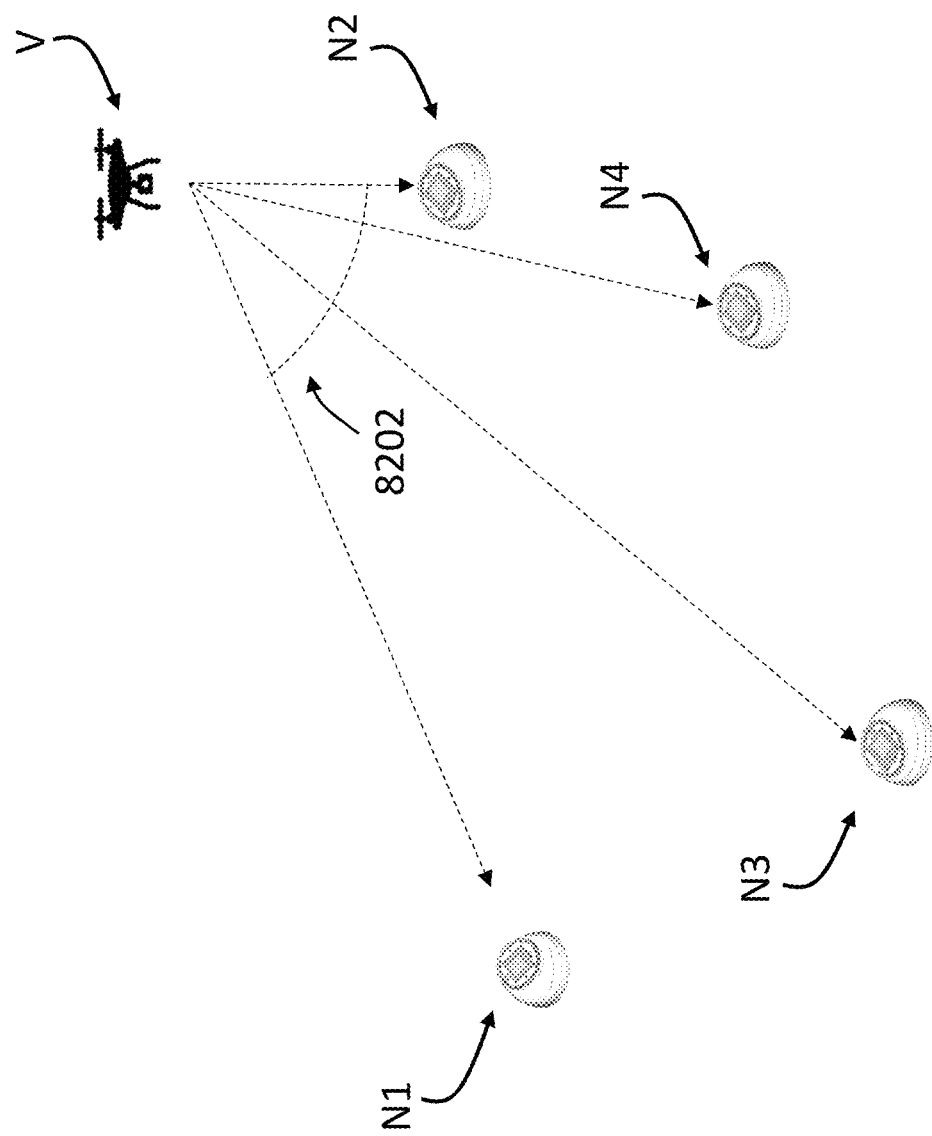
Figure 9C:
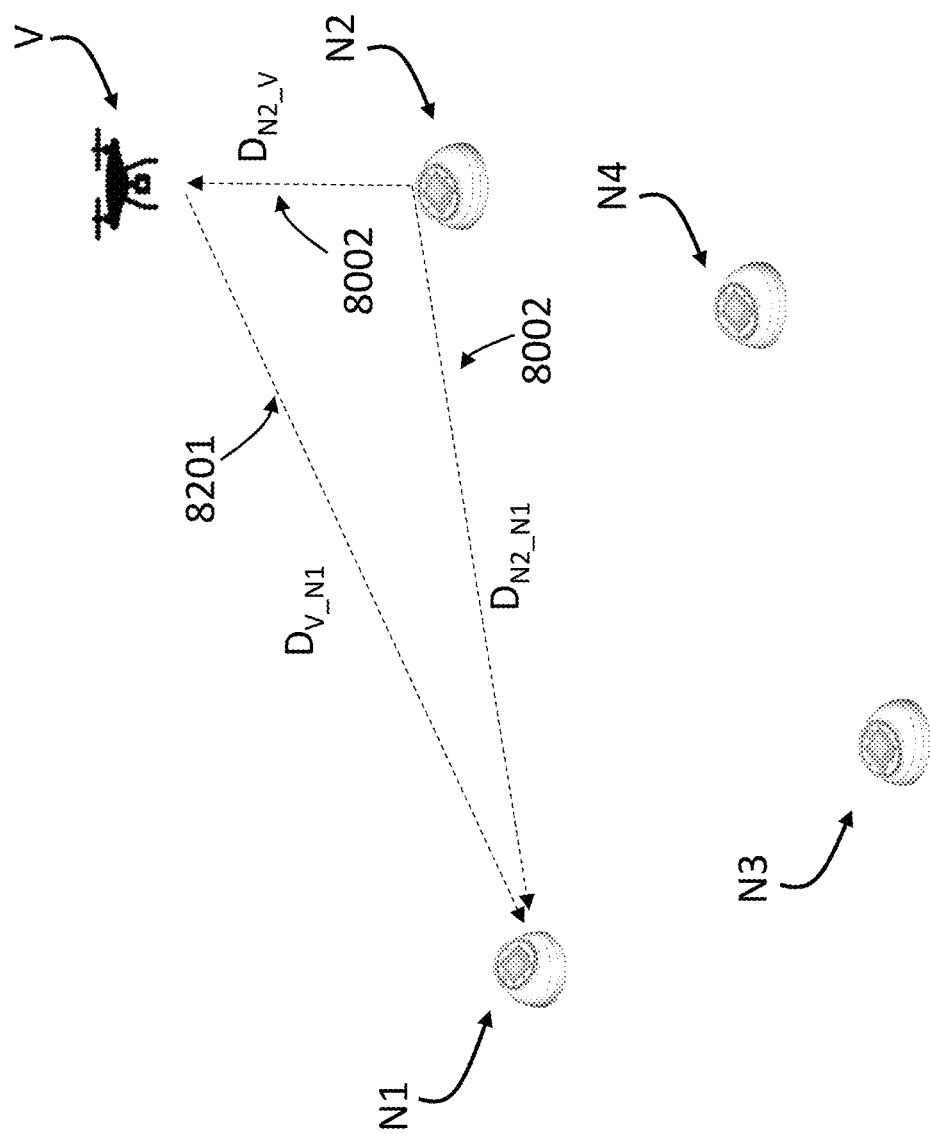
Figure 9D:
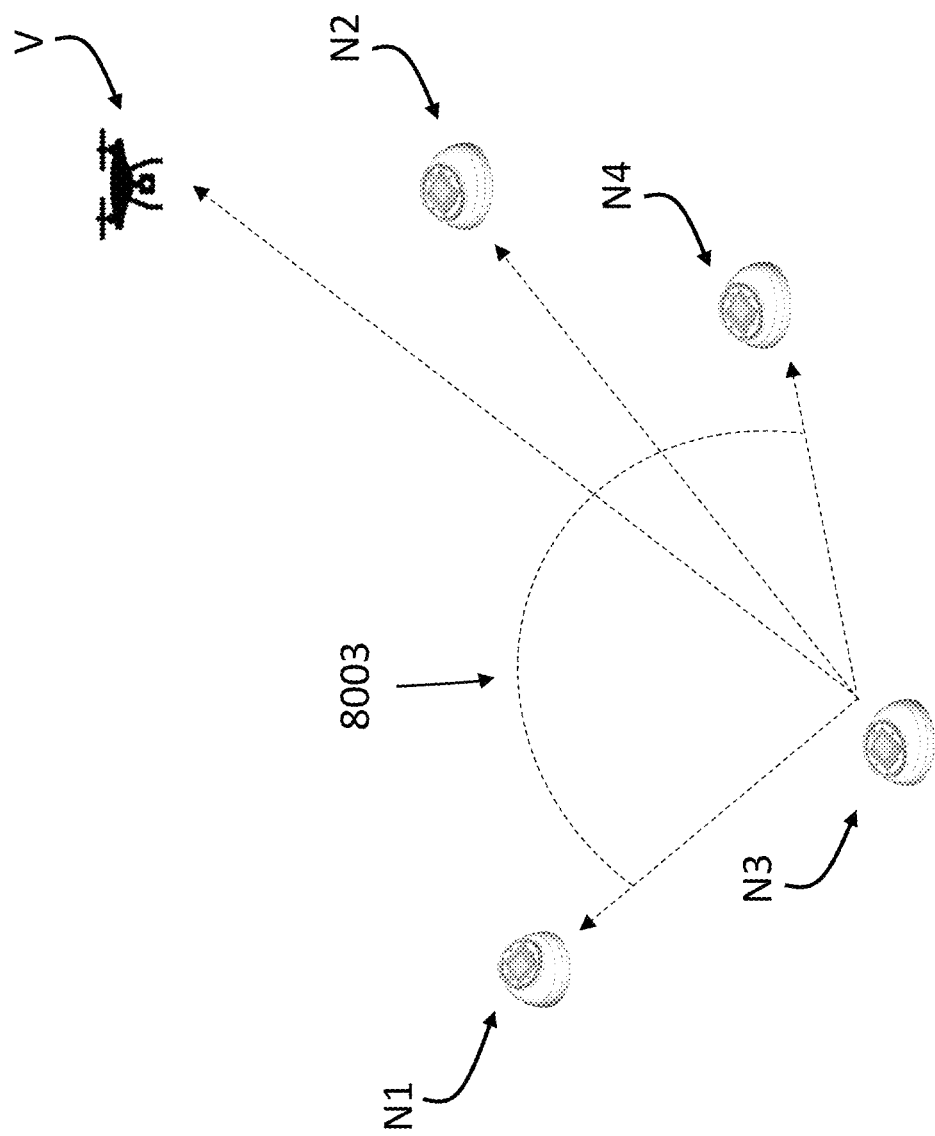
Figure 9E:
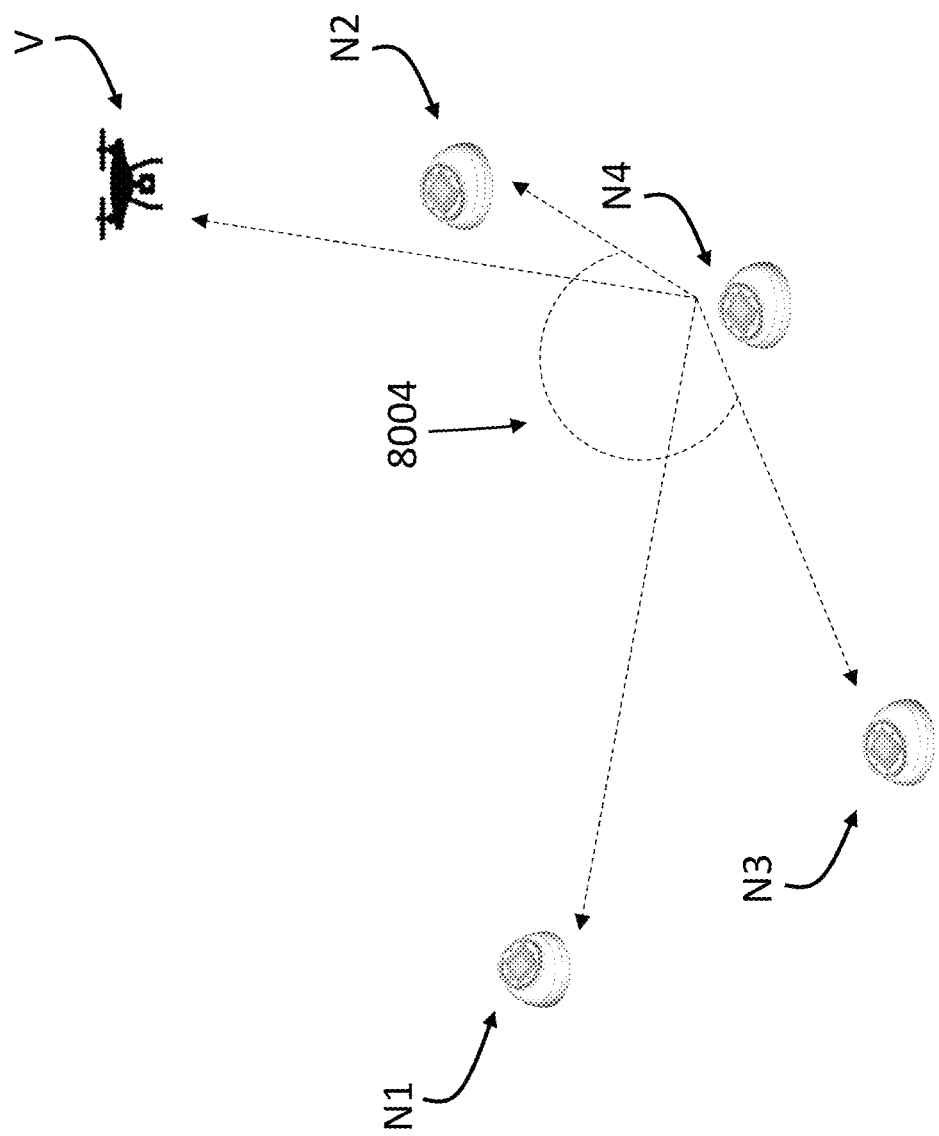

For example, as illustrated in FIGS. 9A and 9B, the RF transmitter node N1 may detect a RF pulse 8002 outputted by the RF transmitter N2, and detect a reply pulse 8202 outputted by the vehicle V in response to the RF pulse 8002. In some cases, the RF transmitter node N2 may be outputting the RF pulse 8002 after the RF transmitter node N1 has outputted the RF pulse 8001. The RF pulses 8001 and 8002 may be, e.g., part of a sequence of at least four RF pulses outputted by four RF transmitter nodes, like that illustrated in FIG. 7A or 7D. For instance, the sequence may further include a RF pulse 8003 outputted by the RF transmitter node N3 and a RF pulse 8004 outputted by the RF transmitter node N4. More particularly, FIG. 9D illustrates the RF transmitter node N3 outputting the RF pulse 8003, while FIG. 9E illustrates the RF transmitter node N4 outputting the RF pulse 8004.

In the above example, the RF transmitter node N1 may be configured to determine a difference d(N2,N1) between a first propagation time and a second propagation time. The first propagation time may indicate a direct signal propagation path for the RF pulse 8002 to propagate from the RF transmitter node N2 to the RF transmitter node N1, as illustrated in FIG. 9C. More particularly, the direct signal propagation path may involve a distance $D_{N2\_N1}$. In some cases, this direct signal propagation path for the RF pulse 8002 may be equal or substantially equal to the direct signal propagation path for the RF pulse 8001 discussed above. The second propagation time may indicate an indirect signal propagation path that involves the RF pulse 8002 propagating the vehicle V, and causing the vehicle V to output a reply pulse 8201 which propagates to the RF transmitter node N1. The indirect signal propagation path may involve a distance of $D_{N2\_V}+D_{V\_N1}$. In some cases, the indirect signal propagation path for the RF pulse 8002, which involves the distance $D_{N2\_V}+D_{V\_N1}$, may be equal to or substantially equal to that for the RF pulse 8001, which involves the distance $D_{V\_N2}+D_{N1\_V}$, as illustrated in FIGS. 8E and 9C, because the vehicle V may be stationary or substantially stationary in the interval between the RF pulse 8001 and the RF pulse 8002 (e.g., 10 microseconds).

The difference d(N2,N1) determined by the RF transmitter node N1 may be based on the equation $d(N2,N1)=D_{N2\_V}/c+D_{V\_N1}/c-D_{N2\_N1}/c$, or $d(N2,N1)=D_{N2\_V}/c+D_{V\_N1}/c+$ switch delay$-D_{N2\_N1}/c$. Similarly, the RF transmitter node N1 may determine a difference d(N3,N1) by detecting a RF pulse outputted by the RF transmitter node N3, and by detecting its corresponding reply pulse. It may further determine a difference d(N4,N1) by detecting a RF pulse outputted by the RF transmitter node N4, and by detecting its corresponding reply pulse. These detected pulses may be used by the RF transmitter node N1 to determine the equations $d(N3,N1)=D_{N3\_V}/c+D_{V\_N1}/c-D_{N3\_N1}/c$ and $d(N4,N1)=D_{N4\_V}/c+D_{V\_N1}/c-D_{N4\_N1}/c$. These propagation time differences d(N2,N1), d(N3,N1), and d(N4,N1) may be equal to or substantially equal to the propagation time differences d(N1,N2), d(N1,N3), and d(N1,N4) discussed above. In this particular example, the RF transmitter node N1 may establish the above equations by detecting RF pulses broadcasted or otherwise outputted by the other RF transmitter nodes (e.g., N2 through N4) and to corresponding reply pulses. As stated above, the RF transmitter node may further be configured to determine its distance $D_{V\_N1}$ to the vehicle V based on the RF pulse 8001. The RF transmitter node N1 may be configured to use the determined distance $D_{V\_N1}$ and the above equations to determine $D_{V\_N2}$, $D_{V\_N3}$, and $D_{V\_N4}$. The RF transmitter node N1 may use these distances to determine a location of the vehicle V relative to the RF transmitter nodes N1 through N4, as discussed above.

Figure 10:
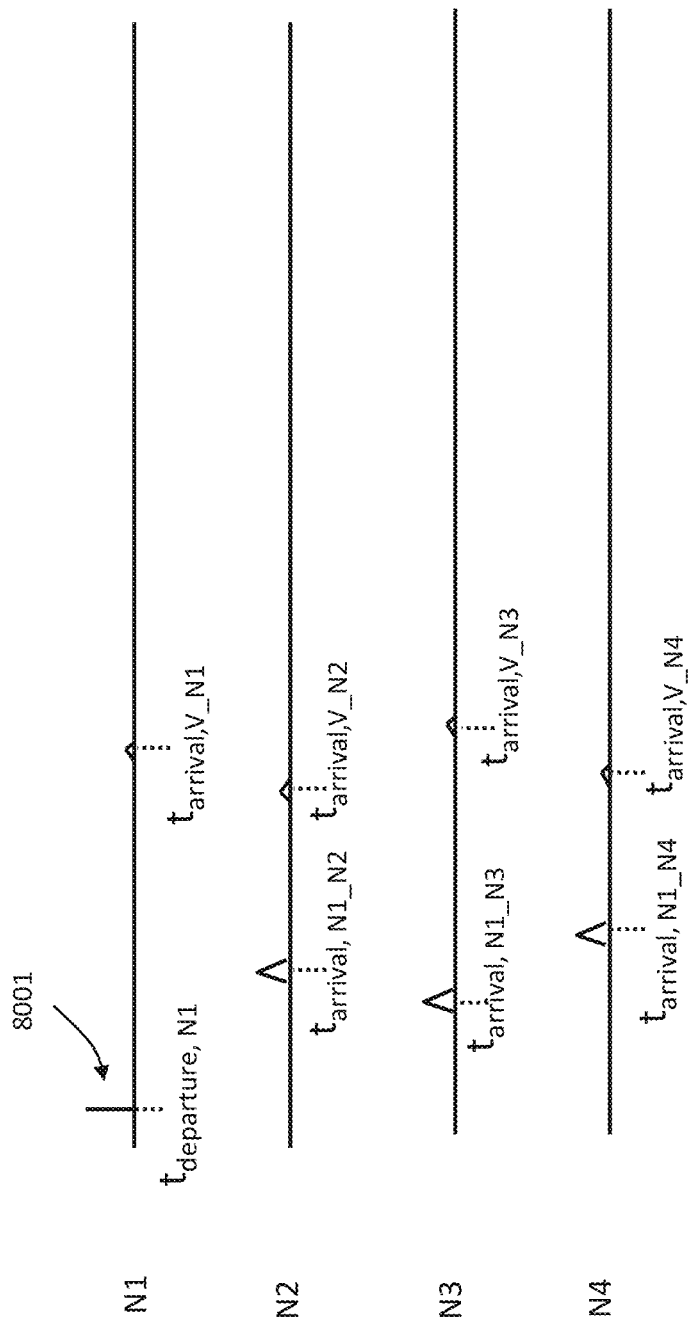
FIG. 10 illustrates the use of RF pulses in a radar mode to determine a location of a vehicle, according to an embodiment herein.

While the above discussion for the RF transmitter nodes N1 through N4 in FIGS. 8A through 9C relate to the Comms mode, they may also be used in a Radar mode. In the radar mode, the vehicle may forego generating a reply pulse (e.g., to save power) or may lack such a capability or supporting hardware (e.g., to save cost). In such a scenario, the RF transmitters N1 through N4 may rely on detecting a reflection of a RF pulse (e.g., 8001) rather than detecting a reply pulse. For instance, FIG. 10 depicts the RF transmitter N1 outputting a RF pulse 8001 at $t_{departure,N1}$. The RF pulse 8001 may propagate to the other RF transmitter nodes N2 through N4 via a direct signal propagation path, such as that illustrated in FIG. 8A, and may be detected at $t_{arrival,N1\_N2}$, $t_{arrival,N1\_N3}$, and $t_{arrival,N1\_N4}$, respectively. The RF pulse 8001 may further propagate to a vehicle in an airspace or other environment around the RF transmitter nodes, and may reflect off a surface of the vehicle. The reflection may propagate back to the RF transmitter nodes N1 through N4, and may be detected at times $t_{arrival,V\_N1}$, $t_{arrival,V\_N2}$, $t_{arrival,V\_N3}$, and $t_{arrival,V\_N4}$, respectively. The reflection may represent an indirect signal propagation path. Similar to the discussion above, a control node or at least one of the RF transmitter nodes N1 through N4 may be configured to determine propagation time differences d(N1,N2), d(N1,N3), and d(N1,N4) based on differences between the direct signal propagation path and the indirect signal propagation path. These propagation time differences may be used to establish equations to solve for respective distances between the vehicle V and the RF transmitter nodes N1 through N4, which may be used to determine a location of the vehicle V relative to the RF transmitter nodes N1 through N4. As stated above, the radar mode may provide the technical advantage of operating without requiring cooperation from an aircraft or other vehicle, which may reduce cost of such a location determination system, and/or increase security (by being able to detect non-cooperating vehicles). In some cases, the active Comms mode may provide the technical advantage of increased signal strength. That is, as a reply pulse is outputted by a vehicle V in the active Comms mode, a signal strength of the reply pulse may attenuate as function of the square (i.e., second power) of its distance from the vehicle V. In the radar mode, as a RF pulse reflects off the vehicle V, a strength of the reflection (also referred to as reflected pulse) is attenuated as a function of the fourth power of its distance from the vehicle V. Thus, the reply pulse may have a stronger signal to noise ratio (SNR) relative to that of a reflection, and thus may be easier to detect at the RF transmitter nodes N1-N4.

In an embodiment, as the number of RF transmitter nodes increase, solving the equations discussed above may result in an overdetermined solution, and numeric algorithms may be used to solve them. In some cases, a Least Mean Squares fit may be used to solve the above equations to determine a location of a vehicle.

In an embodiment, the RF pulses discussed above may be outputted in response to an interrogation pulse from the vehicle V. More particularly, the interrogation pulse may be an RF pulse used for triggering the RF transmitter nodes N1 through N4 to output a sequence of respective RF pulses. The interrogation pulse may be used in the Comms mode (e.g., the passive Comms mode or the active Comms mode). In the Radar mode, the vehicle V may have a capability to output an interrogation pulse, or may omit such capability so as to save cost.

Figure 11A:
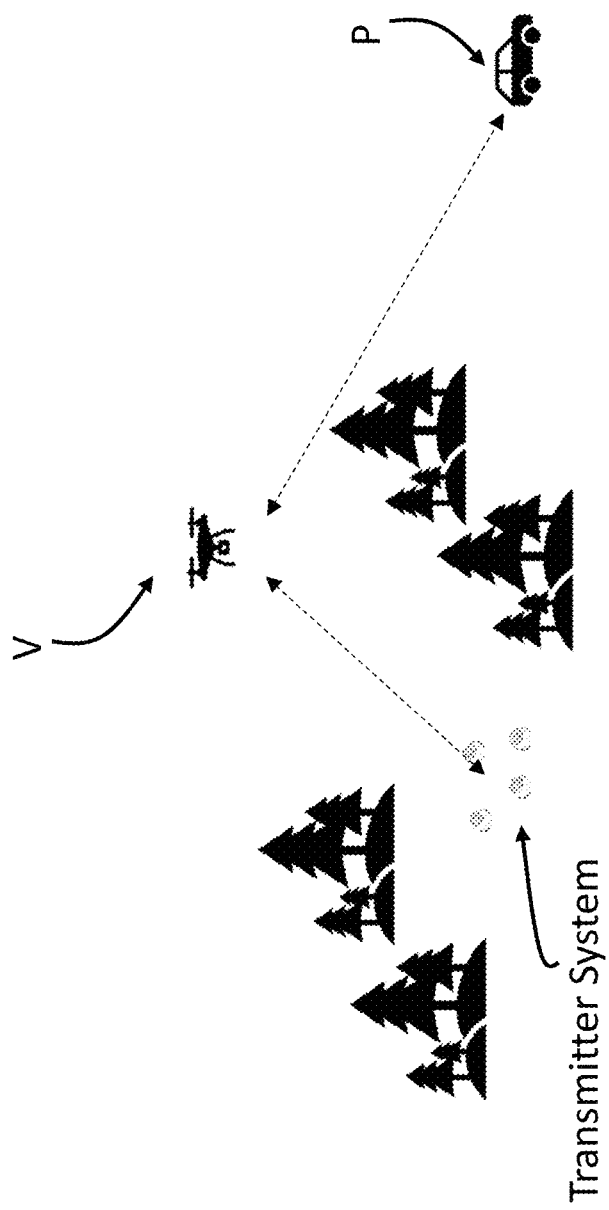
FIGS. 11A and 11B illustrate a system in which a vehicle or set of vehicles act as a relay node for another vehicle or another set of vehicles, according to an embodiment herein.
Figure 11B:
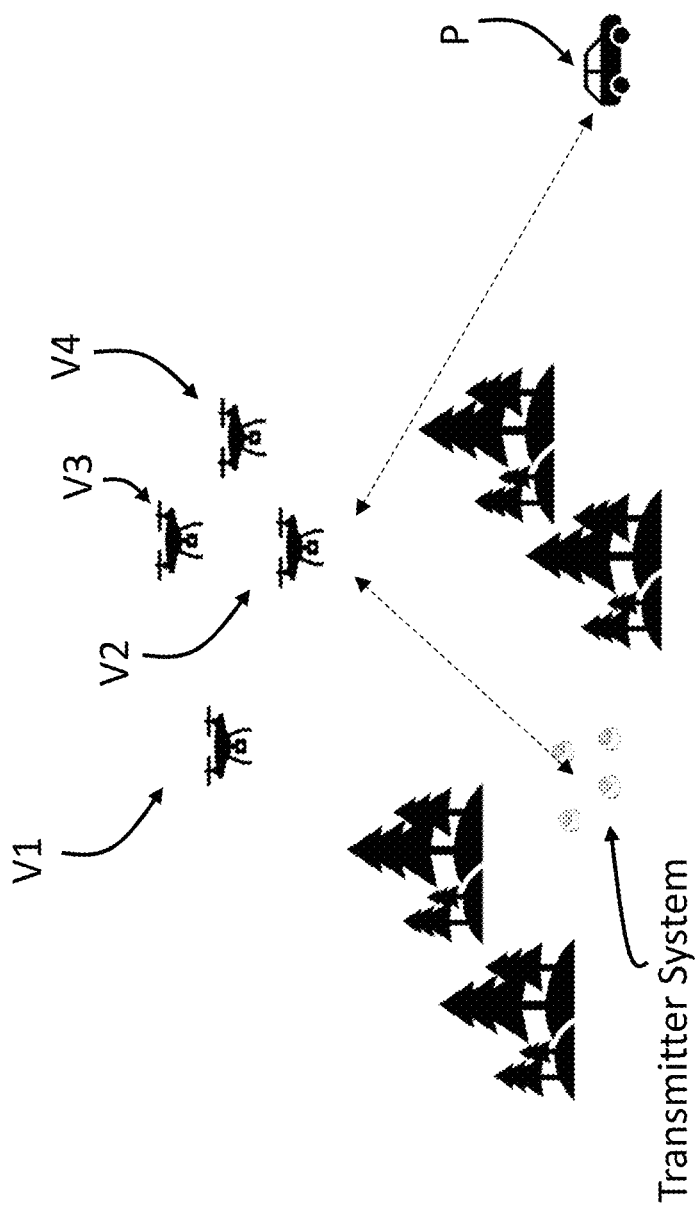

In an embodiment, the vehicle V may be used as a relay node which is used to determine a location of another node, such as another vehicle that lacks line-of-sight communication with a surface-based transmitter system. For instance FIG. 11A depicts a situation in which a vehicle P (e.g., an unmanned automobile) is separated from a ground-based transmitter system by a hill, which may block RF pulses from reaching the vehicle P, and block direct communication between the transmitter system and the vehicle P. In such a situation, the system in FIG. 11A, which may be referred to as a Test Range Accurate Positioning System (TRAPS), may use an intermediate vehicle V to relay timing and location information to the vehicle P. In this example, the vehicle V may be located in a region in which it has line-of-sight communication with the ground-based transmitter system, and has line-of-sight communication with the vehicle P. FIG. 11B depicts a more specific embodiment in which multiple intermediate vehicles V1 through V4 may be used to determine a location of the vehicle P. In this example, the intermediate vehicles V1 through V4 may be configured to output a sequence of RF pulses that propagate toward the vehicle P. The propagation times of these RF pulses to the vehicle P, and propagation times of a reflection of those RF pulses off of a surface of the vehicle P or of a reply pulse from the vehicle P may be used to determine a location of the vehicle P, in a manner similar to the techniques discussed above.

In an embodiment, the location determination system (e.g., 1000) may have more than four nodes. If there are at least four transceiver nodes on the ground and four transceiver nodes on an aircraft, the system may be able to determine the altitude of the aircraft with respect to ground using pairs of distances from the four ground transceiver nodes to the four aircraft-mounted transceiver nodes.

Figure 12:
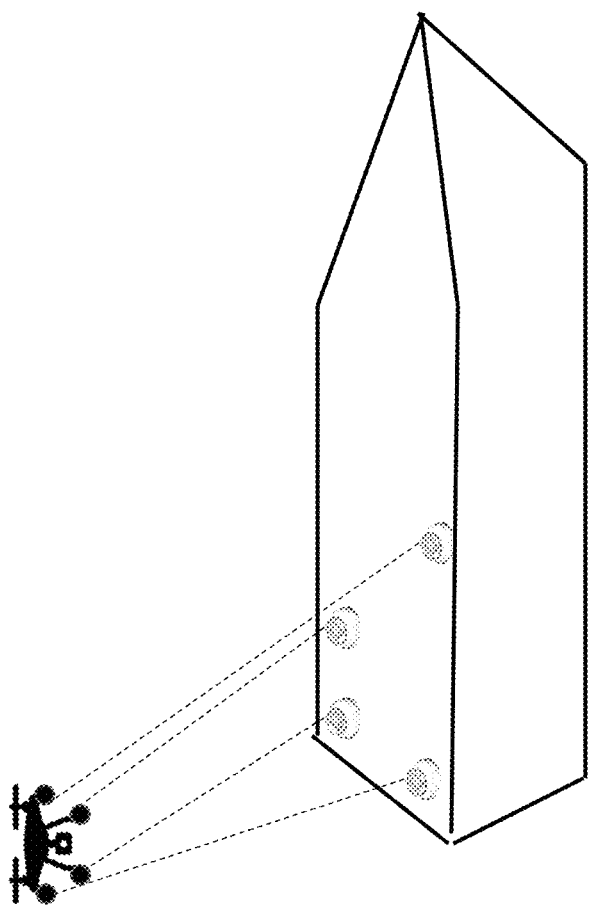
FIG. 12 illustrates an example in which a surface-based transmitter/transceiver system is on a ship.

FIG. 12 depicts an example of the ship-based ultrawideband multistatic positioning system (SUMPS). In this example, the surface-based transmitter system may be located on a ship, such as around a landing deck on the ship. In one example, the surface-based transmitter system may have at least four RF transmitter/transceiver nodes disposed on the landing deck. The surface-based transmitter system may facilitate landing of an aircraft on the landing deck. In some cases, the aircraft may include its own RF transmitter/transceiver node or set of nodes (e.g., a set of four nodes). The surface-based transmitter system and/or the aircraft may be configured to acquire each other's pulses or other signaling and determine relative altitude between the landing deck on the ship and the aircraft. In some cases, the system or the aircraft may be configured to determine pairwise time difference of arrival, and use this information to determine the relative altitude, pitch, roll, and yaw between the ship and the aircraft, and determine a range between the ship and the aircraft. Once the aircraft has gone into a stabilized mode at a holding point, the aircraft may begin its final descent to land on the landing deck. In some cases, the landing process may be controlled by a flight control system that is being fed with information in a low latency and frequently updated manner. The flight control system may determine the relative roll, yaw, and pitch between the aircraft and the ship during this landing process, to check that these values are approaching zero as the aircraft is landing, and to check that the range between the aircraft and the ship is approaching zero. The flight control system may determine the range and the relative roll, yaw, and pitch using RF pulses from the surface-based transmitter/transceiver system, by themselves or in combination with RF pulses from the transmitter/transceiver nodes on the aircraft, in a manner that is the same as or similar to what is discussed in FIGS. 7A through 10. As stated above, the surface-based transmitter system and the aircraft may output ultrawideband pulses (e.g., in the millimeter wave spectrum), which be robust and tolerant of various atmospheric conditions (e.g., rain or snow).

ADDITIONAL DISCUSSION OF VARIOUS EMBODIMENTS

Embodiment 1 relates to a surface-based transmitter system for assisting determination of vehicle location. The system comprises a set of radio frequency (RF) transmitter nodes (e.g., transceiver nodes) that, when deployed at different respective locations, are configured to output a sequence of respective RF pulses with a predefined inter-pulse delay between each pair of consecutive RF pulses in the sequence, wherein the pre-defined inter-pulse delay is longer than 1 microsecond. In this embodiment, the set of RF transmitter nodes include at least a first RF transmitter node, a second RF transmitter node, a third RF transmitter node, and a fourth RF transmitter node, which are configured to output a first RF pulse, a second RF pulse, a third RF pulse, and a fourth RF pulse, respectively, of the sequence of RF pulses.

Embodiment 2 includes the system of embodiment 1. In this embodiment, the predefined inter-pulse delay is at least 10 microseconds.

Embodiment 3 includes the system of embodiment 1 or 2. In this embodiment, each RF pulse of the sequence of RF pulses has at least one of: a bandwidth that is greater than or equal to 1 GHz, or a duration that is shorter than or equal to 1 nanosecond.

Embodiment 4 includes the system of any one of embodiments 1-3. In this embodiment, at least the first RF transmitter node is configured to output the first RF pulse at a predefined time.

Embodiment 5 includes the system of any one of embodiments 1-4. In this embodiment, each RF pulse of the sequence of RF pulses is outputted in an omnidirectional or hemispherical pattern.

Embodiment 6 includes the system of any one of embodiments 1-5. In this embodiment, the set of RF transmitter nodes are configured to transmit the sequence of respective RF pulses in a series of respective non-overlapping time slots. Further, each RF transmitter node of the set of RF transmitter nodes is configured to output a respective RF pulse at a beginning of a respective time slot, and to further output a respective data signal in the respective time slot after outputting the respective RF pulse, wherein the respective data signal encodes at least one of the following: a respective node identifier for the RF transmitter node, or a respective clock value that indicates when the respective RF pulse is outputted by the RF transmitter node.

Embodiment 7 includes the system of embodiment 6. In this embodiment, each RF transmitter node of the set of RF transmitter nodes is configured to output the respective data signal after a predefined range gate delay has elapsed since the outputting of the respective RF pulse. Further, each of the RF transmitter nodes is configured to output the respective data signal with a lower transmission power than a transmission power of the respective RF pulse.

Embodiment 8 includes the system of any one of embodiments 1-7. In this embodiment, the second RF transmitter node, the third RF transmitter node, and the fourth RF transmitter node are each configured to detect: (a) the first RF pulse outputted by the first RF transmitter node, and (b) a reply pulse outputted by a vehicle in an environment of the RF transmitter system in response to the first RF pulse, or a reflection of the first RF pulse off of the vehicle. Further, the RF transmitter system is configured to determine a location of the vehicle based on: (a) when the first RF pulse is detected by the second transmitter node, the third RF transmitter node, and the fourth RF transmitter node, and (b) when the reflection of the first RF pulse or when the reply pulse is detected by the first RF transmitter node, the second RF transmitter node, the third RF transmitter node, and the fourth RF transmitter node.

Embodiment 9 includes the system of any one of embodiments 1-8. In this embodiment, at least the first RF transmitter node is configured to: detect the second RF pulse, the third RF pulse, and the fourth RF pulse outputted by the second RF transmitter node, the third RF transmitter node, and the fourth RF transmitter node, respectively; detect a first reply pulse, a second reply pulse, a third reply pulse, and a fourth reply pulse, which are outputted by a vehicle in an environment of the system in response to the first RF pulse, the second RF pulse, the third RF pulse, and the fourth RF pulse, respectively; determine a location of the vehicle based on when the second RF pulse, third RF pulse, and fourth RF pulse are detected by the first RF transmitter node, and based on when the first reply pulse, second reply pulse, third reply pulse, and fourth reply pulse are detected by the first RF transmitter node.

Embodiment 10 includes the system of embodiment 9. In this embodiment, the first RF transmitter node is configured to: determine, based on the second reply pulse, the third reply pulse, and the fourth reply pulse: indirect path propagation times that measure: respective amounts of time for the second RF pulse, the third RF pulse, or the fourth RF pulse to propagate to the vehicle, plus respective amounts of time for the second reply pulse, the third reply pulse, and the fourth reply pulse to propagate to the first RF transmitter node from the vehicle, determine respective propagation time differences between the indirect path propagation times and direct path propagation times, wherein the direct path propagation times measure respective amounts of time taken by the second RF pulse, the third RF pulse, and the fourth RF pulse to directly reach the first RF transmitter node, wherein the location of the vehicle is determined based on the indirect path propagation times and the propagation time differences.

Embodiment 11 includes the system of any one of embodiments 1-7. In this embodiment, at least the first RF transmitter node is configured to: detect the second RF pulse, the third RF pulse, and the fourth RF pulse outputted by the second RF transmitter node, the third RF transmitter node, and the fourth RF transmitter node, respectively; detect a first reflection, a second reflection, a third reflection, and a fourth reflection of the first RF, the second RF pulse, the third RF pulse, and the fourth RF pulse, respectively, off of a vehicle in an environment of the RF transmitter system; determine a location of the vehicle based on when the second RF pulse, third RF pulse, and fourth RF pulse are detected by the first RF transmitter node, and based on when the first reflection, second reflection, third reflection, and fourth reflection are detected by the first RF transmitter node.

Embodiment 12 includes the system of any one of embodiments 1-11. In this embodiment, the set of RF transmitter nodes are configured to: detect an interrogation pulse from a vehicle in an environment of the system, wherein the interrogation pulse is a pulse for requesting the outputting of the sequence of respective RF pulses, and output the sequence of respective RF pulses after different delay periods, respectively, have elapsed since detection of the interrogation pulse by the set of RF transmitter nodes.

Embodiment 13 includes the system of any one of embodiments 1-12. In this embodiment, the system is further comprising a surface-based control node having a communication link to the set of RF transmitter nodes. Further, the control node is configured to output one or more synchronization signals that reach the set of RF transmitter nodes at a same time via the communication link, and wherein each RF transmitter node of the set of RF transmitter nodes is configured, in response to detecting the one or more synchronization signals at the same time as the other RF transmitter nodes, to output a respective RF pulse after waiting a respective delay period different from delay periods used by other RF transmitter nodes of the set of RF transmitter nodes.

Embodiment 14 includes the system of any one of embodiments 1-13. In this embodiment, the system further comprises a surface-based control node having a communication link to the set of RF transmitter nodes. Further, the control node is configured to output a sequence of synchronization signals that reach the set of RF transmitter nodes at a series of different times separated by the predefined inter-pulse delay, wherein the RF transmitter nodes are configured, in response to detecting a respective synchronization signal of the sequence of synchronization signals, output a respective RF pulse immediately or after waiting a common delay period used by the set of RF transmitter nodes.

Embodiment 15 includes the system of any one of embodiments 1-13. In this embodiment, the set of RF transmitter nodes are communicatively coupled as a series of RF transmitter nodes via a daisy chain communication link, and wherein each RF transmitter node of the set of RF transmitter nodes is configured, if a synchronization signal is received from a previous RF transmitter node in the series of RF transmitter nodes, to output a respective RF pulse in response to the synchronization signal, and to relay the synchronization signal to a next RF transmitter node in the series of RF transmitter nodes after waiting a delay period since detecting the synchronization signal from the previous RF transmitter node, wherein the delay period is equal to or based on the predefined inter-pulse delay.

Embodiment 16 relates to a method for determining a location of a vehicle. The method comprises: detecting, by the vehicle, a sequence of radio frequency (RF) pulses that are generated and outputted, respectively, by a set of surface-based RF transmitter nodes, wherein the sequence of RF pulses include at least a first RF pulse, a second RF pulse, a third RF pulse, and a fourth RF pulse, which are outputted by a first RF transmitter node, a second RF transmitter node, a third RF transmitter node, and a fourth RF transmitter node, respectively, of the set of RF transmitter nodes with a predefined inter-pulse delay between each pair of consecutive RF pulses of the sequence of RF pulses, wherein the predefined inter-pulse delay is at least 1 microsecond. The method further comprises determining propagation times that indicative respective amounts of time taken by the set of RF pulses to directly propagate to the vehicle; and determining, based on the propagation times, a location of the vehicle relative to the set of surface-based RF transmitter nodes.

Embodiment 17 includes the method of embodiment 16. Further, the predefined delay is at least 10 microseconds, and wherein each RF pulse of the set of RF pulses has at least one of: a bandwidth that is greater than or equal to 1 GHz, or a duration that is shorter than or equal to 1 nanosecond.

Embodiment 18 includes the method of embodiment 16 or 17. In this embodiment, the method further comprises the vehicle outputting a respective reply pulse in response to detecting each RF pulse of the set of RF pulses.

Embodiment 19 includes the method of any one of embodiments 16-18. In this embodiment, the method further comprises the vehicle determining, for each RF pulse in the sequence of RF pulses, which RF transmitter node outputted the RF pulse based on an order of the RF pulse in the sequence.

Embodiment 20 includes the method of any one of embodiments 16-19. In this embodiment, each RF pulse of the set of RF pulses is followed by a respective data signal that encodes a node identifier of a RF transmitter node which outputted the RF pulse, and wherein the method further comprises: extracting, by the vehicle, the node identifier from the data signal for each RF pulse of the set of RF pulses; retrieving, based on the node identifier, node location information which indicates a location of the RF transmitter node which outputted the RF pulse. The location of the vehicle is determined based on the retrieved node location information.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or statistical models of the different embodiments described.

What is claimed is:

1. A surface-based transmitter system for assisting determination of vehicle location, the system comprising:
    a set of radio frequency (RF) transmitter nodes that, when deployed at different respective locations, are configured to output a sequence of respective RF pulses with a predefined inter-pulse delay between each pair of consecutive RF pulses in the sequence,
    wherein the predefined inter-pulse delay is longer than 1 microsecond;
    wherein the set of RF transmitter nodes includes at least a first RF transmitter node, a second RF transmitter node, a third RF transmitter node, and a fourth RF transmitter node, which are configured to output a first RF pulse, a second RF pulse, a third RF pulse, and a fourth RF pulse, respectively, of the sequence of RF pulses;
    wherein the set of RF transmitter nodes is further configured to transmit the sequence of respective RF pulses in a series of respective non-overlapping time slots;
    wherein each RF transmitter node of the set of RF transmitter nodes is configured to output a respective RF pulse at a beginning of a respective time slot, and to further output a respective data signal in the respective time slot after outputting the respective RF pulse;
    wherein the respective data signal encodes at least one of the following: a respective node identifier for the RF transmitter node, or a respective clock value that indicates when the respective RF pulse is outputted by the RF transmitter node; and
    wherein each RF transmitter node of the set of RF transmitter nodes is further configured to output the respective data signal after a predefined range gate delay has elapsed since the outputting of the respective RF pulse, and
    wherein each RF transmitter node of the set of RF transmitter nodes is further configured to output the respective data signal with a lower transmission power than a transmission power of the respective RF pulse.

2. The system of claim 1, wherein the predefined inter-pulse delay is at least 10 microseconds.

3. The system of claim 2, wherein each RF pulse of the sequence of RF pulses has at least one of: a bandwidth that is greater than or equal to 1 GHz, or a duration that is shorter than or equal to 1 nanosecond.

4. The system of claim 1, wherein at least the first RF transmitter node is configured to output the first RF pulse at a predefined time.

5. The system of claim 1, wherein each RF pulse of the sequence of RF pulses is outputted in an omnidirectional or hemispherical pattern.

6. The system of claim 1, wherein the second RF transmitter node, the third RF transmitter node, and the fourth RF transmitter node are each configured to detect: (a) the first RF pulse outputted by the first RF transmitter node, and (b) a reply pulse outputted by a vehicle in an environment of the system in response to the first RF pulse, or a reflection of the first RF pulse off of the vehicle; and
    wherein the RF transmitter system is further configured to determine a location of the vehicle based on: (a) when the first RF pulse is detected by the second transmitter node, the third RF transmitter node, and the fourth RF transmitter node, and (b) when the reflection of the first RF pulse or when the reply pulse is detected by the first RF transmitter node, the second RF transmitter node, the third RF transmitter node, and the fourth RF transmitter node.

7. The system of claim 1, wherein at least the first RF transmitter node is configured to:
    detect the second RF pulse, the third RF pulse, and the fourth RF pulse outputted by the second RF transmitter node, the third RF transmitter node, and the fourth RF transmitter node, respectively;
    detect a first reply pulse, a second reply pulse, a third reply pulse, and a fourth reply pulse, which are outputted by a vehicle in an environment of the system in response to the first RF pulse, the second RF pulse, the third RF pulse, and the fourth RF pulse, respectively;
    determine a location of the vehicle based on when the second RF pulse, third RF pulse, and fourth RF pulse are detected by the first RF transmitter node, and based on when the first reply pulse, the second reply pulse, the third reply pulse, and the fourth reply pulse are detected by the first RF transmitter node.

8. The system of claim 7, wherein the first RF transmitter node is further configured to:
    determine, based on the second reply pulse, the third reply pulse, and the fourth reply pulse, indirect path propagation times that measure respective amounts of time for the second RF pulse, the third RF pulse, or the fourth RF pulse to propagate to the vehicle, plus respective amounts of time for the second reply pulse, the third reply pulse, and the fourth reply pulse to propagate to the first RF transmitter node from the vehicle,
    determine respective propagation time differences between the indirect path propagation times and direct path propagation times, wherein the direct path propagation times measure respective amounts of time taken by the second RF pulse, the third RF pulse, and the fourth RF pulse to directly reach the first RF transmitter node, wherein the location of the vehicle is determined based on the indirect path propagation times and the propagation time differences.

9. The system of claim 1, wherein at least the first RF transmitter node is further configured to:
   detect the second RF pulse, the third RF pulse, and the fourth RF pulse outputted by the second RF transmitter node, the third RF transmitter node, and the fourth RF transmitter node, respectively;
   detect a first reflection, a second reflection, a third reflection, and a fourth reflection of the first RF pulse, the second RF pulse, the third RF pulse, and the fourth RF pulse, respectively, off of a vehicle in an environment of the system;
   determine a location of the vehicle based on when the second RF pulse, the third RF pulse, and the fourth RF pulse are detected by the first RF transmitter node, and based on when the first reflection, second reflection, third reflection, and fourth reflection are detected by the first RF transmitter node.

10. The system of claim 1, wherein the set of RF transmitter nodes is further configured to:
    detect an interrogation pulse from a vehicle in an environment of the system, wherein the interrogation pulse is a pulse for requesting the outputting of the sequence of respective RF pulses, and
    output the sequence of respective RF pulses after different delay periods, respectively, have elapsed since detection of the interrogation pulse by the set of RF transmitter nodes.

11. The system of claim 1, further comprising a surface-based control node having a communication link to the set of RF transmitter nodes,
    wherein the control node is configured to output one or more synchronization signals that reach the set of RF transmitter nodes at a same time via the communication link, and
    wherein each RF transmitter node of the set of RF transmitter nodes is further configured, in response to detecting the one or more synchronization signals at the same time as the other RF transmitter nodes, to output a respective RF pulse after waiting a respective delay period different from delay periods used by other RF transmitter nodes of the set of RF transmitter nodes.

12. The system of claim 1, further comprising a surface-based control node having a communication link to the set of RF transmitter nodes,
    wherein the control node is configured to output a sequence of synchronization signals that reach the set of RF transmitter nodes at a series of different times separated by the predefined inter-pulse delay, and
    wherein the RF transmitter nodes are configured, in response to detecting a respective synchronization signal of the sequence of synchronization signals, output a respective RF pulse immediately or after waiting a common delay period used by the set of RF transmitter nodes.

13. The system of claim 1, wherein the set of RF transmitter nodes are communicatively coupled as a series of RF transmitter nodes via a daisy chain communication link, and
    wherein each RF transmitter node of the set of RF transmitter nodes is configured, if a synchronization signal is received from a previous RF transmitter node in the series of RF transmitter nodes, to output a respective RF pulse in response to the synchronization signal, and to relay the synchronization signal to a next RF transmitter node in the series of RF transmitter nodes after waiting a delay period since detecting the synchronization signal from a previous RF transmitter node, wherein the delay period is equal to or based on the predefined inter-pulse delay.

* * * * *